United States Patent
Jackson et al.

(10) Patent No.: US 9,602,172 B2
(45) Date of Patent: Mar. 21, 2017

(54) USER IDENTIFICATION AND LOCATION DETERMINATION IN CONTROL APPLICATIONS

(71) Applicant: Crestron Electronics, Inc., Rockleigh, NJ (US)

(72) Inventors: Daniel Jackson, Valhalla, NY (US); Fred Bargetzi, Upper Saddle River, NJ (US); Brian Donlan, Edgewater, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 266 days.

(21) Appl. No.: 14/019,418

(22) Filed: Sep. 5, 2013

(65) Prior Publication Data

US 2014/0070919 A1 Mar. 13, 2014

Related U.S. Application Data

(60) Provisional application No. 61/696,892, filed on Sep. 5, 2012, provisional application No. 61/768,212, filed on Feb. 22, 2013.

(51) Int. Cl.
*G05B 19/00* (2006.01)
*G05B 23/00* (2006.01)
(Continued)

(52) U.S. Cl.
CPC ....... *H04B 5/0062* (2013.01); *G06K 7/10297* (2013.01); *G08C 17/02* (2013.01); *G08C 23/04* (2013.01); *H04L 67/125* (2013.01); *H04M 1/72533* (2013.01); *H04W 4/043* (2013.01); *G08C 2201/61* (2013.01);
(Continued)

(58) Field of Classification Search
CPC ...... G06F 21/35; G06F 1/1626; G06F 1/1684; G06F 1/1698; G06F 21/31; G06F 21/36; G06F 3/0346; G06F 21/79; G06F 21/42; G07C 9/00857; H04M 2203/6081; H04M 2250/04; G06K 19/0716; G06K 19/07345; G06K 19/0723; G06K 7/10297; G06K 7/10386; G06K 19/07732; G06K 19/07733; G06K 7/10267; G06K 7/10881; H04L 63/0492; H04L 63/0853; G06Q 20/32; G06Q 20/3278; H04W 4/008; H04W 4/02; H04W 4/00; G08C 2201/91; G08C 17/02; G08C 2201/93; G08C 17/00; G08C 2201/20;
(Continued)

(56) References Cited

U.S. PATENT DOCUMENTS 6,708,217 B1 * 3/2004 Colson et al. ................ 709/231
7,030,731 B2 * 4/2006 Lastinger ............ G06K 7/0008
340/10.1

(Continued)

*Primary Examiner* — Emily C Terrell
(74) *Attorney, Agent, or Firm* — Crestron Electronics, Inc

(57) ABSTRACT

A system in which a portable electronic device communicates with an external device to determine a location. Upon determining its location, the portable electronic device transmits this information as well as identifying information to a control processor. The control processor controls one or more controllable devices according to the location and identifying information. The portable electronic device may determine the location via NFC tag or via one or more RF beacons transmitting information according to the Bluetooth 4.0 protocol.

30 Claims, 18 Drawing Sheets

(51) Int. Cl.
- *G06F 7/00* (2006.01)
- *G06F 7/04* (2006.01)
- *G06K 19/00* (2006.01)
- *G08B 29/00* (2006.01)
- *G08C 19/00* (2006.01)
- *H04B 1/00* (2006.01)
- *H04B 1/38* (2015.01)
- *H04B 3/00* (2006.01)
- *H04Q 1/00* (2006.01)
- *H04Q 9/00* (2006.01)
- *H04B 5/00* (2006.01)
- *G06K 7/10* (2006.01)
- *H04M 1/725* (2006.01)
- *G08C 17/02* (2006.01)
- *G08C 23/04* (2006.01)
- *H04W 4/04* (2009.01)
- *H04L 29/08* (2006.01)
- *H04W 4/00* (2009.01)

(52) U.S. Cl.
CPC .... *H04M 2250/02* (2013.01); *H04M 2250/04* (2013.01); *H04W 4/008* (2013.01)

(58) Field of Classification Search
CPC .............. G08C 2201/32; H04B 5/0062; H04B 5/0031; H04B 5/02; H04Q 2209/47
USPC ........ 340/5.61, 5.5, 10.1, 10.52, 12.5, 13.25
See application file for complete search history.

(56) References Cited

U.S. PATENT DOCUMENTS

| | | | |
|---|---|---|---|
| 7,571,863 B2* | 8/2009 | Lauper | 235/492 |
| 7,751,829 B2* | 7/2010 | Masuoka | G01S 5/0294 455/41.2 |
| 8,215,546 B2 | 7/2012 | Lin | |
| 8,665,154 B2* | 3/2014 | Lin | G01S 5/0252 342/451 |
| 9,179,492 B2* | 11/2015 | Meier | H04W 80/00 |
| 9,367,785 B2* | 6/2016 | Sabesan | G01S 7/42 |
| 2005/0027887 A1* | 2/2005 | Zimler et al. | 709/249 |
| 2007/0171091 A1* | 7/2007 | Nisenboim et al. | 340/825.69 |
| 2007/0290924 A1* | 12/2007 | McCoy | G06Q 10/087 342/464 |
| 2009/0265776 A1* | 10/2009 | Baentsch et al. | 726/9 |
| 2010/0052901 A1 | 3/2010 | Szucs | |
| 2010/0081375 A1* | 4/2010 | Rosenblatt et al. | 455/41.1 |
| 2012/0188052 A1 | 7/2012 | Rosenblatt | |
| 2013/0247117 A1* | 9/2013 | Yamada et al. | 725/93 |
| 2013/0314214 A1* | 11/2013 | Leica et al. | 340/10.1 |

* cited by examiner

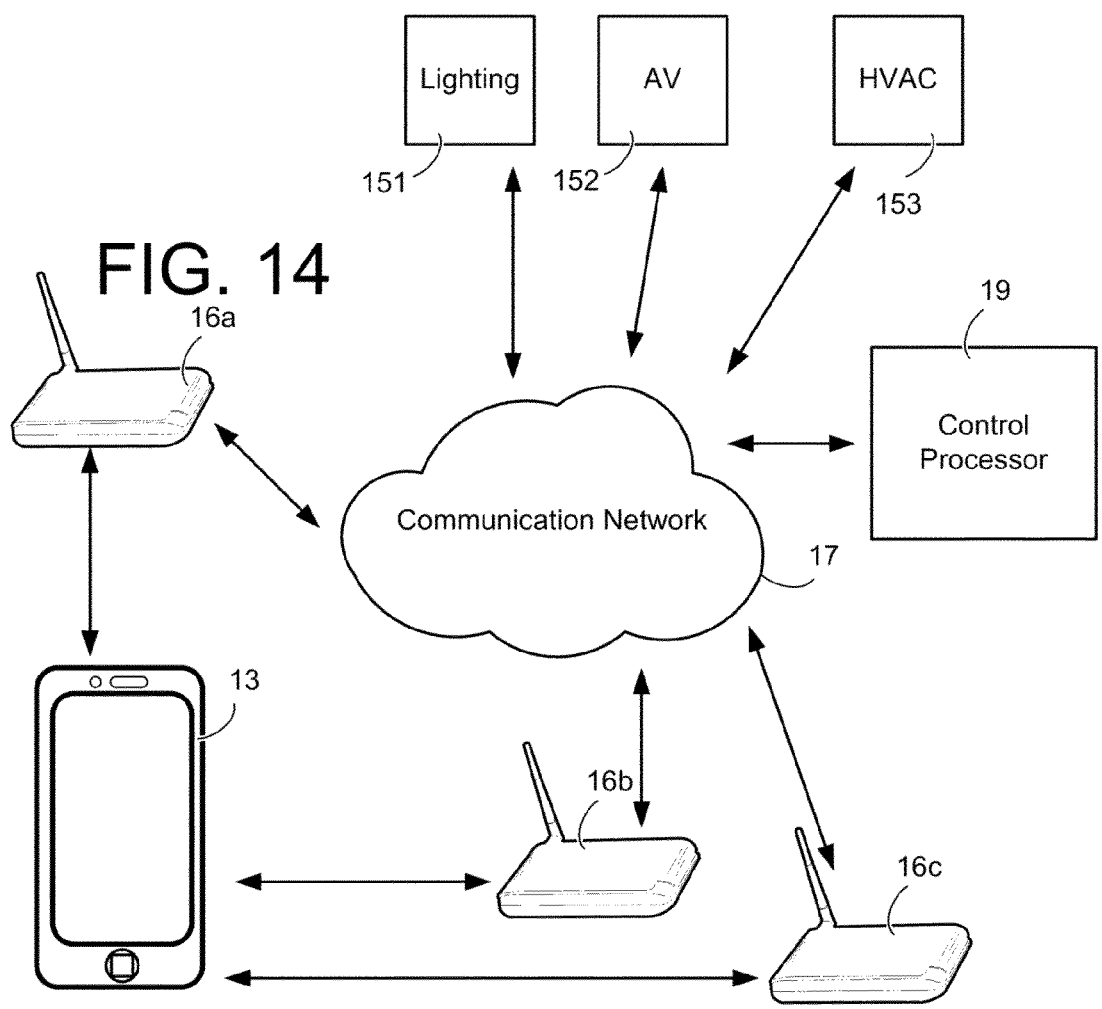

USER IDENTIFICATION AND LOCATION DETERMINATION IN CONTROL APPLICATIONS

BACKGROUND OF THE INVENTION

Technical Field

The present invention relates to control networks and more specifically to control networks leveraging RF communication standards such as near field communication standards and Bluetooth 4.0 standards.

Background Art

The ever-expanding reach of smart phones and tablets has recently extended to the building automation field. Smart phones and tablets are increasingly providing convenient and varied control options for residential and commercial buildings. Where there was once a myriad of remote controls or no remote control at all, there is now a single smart portable device running an "app", such as a control application.

A couple such control applications are Crestron Mobile Pro® or Crestron Mobile® available from Crestron Electronics, Inc. of Rockleigh, N.J. With a control application, such as Crestron Mobile Pro®, a user may access a control network via a mobile network or wifi network thereby allowing for control of the various devices and control elements incorporated in the network from a smart portable device. For example, a user may now access a control network from his smart phone to turn off a bedroom light from another room in the home or even a location as remote as his office or across the globe while on vacation.

While the introduction of smart portable devices to building automation has had a positive impact, existing systems do not fully leverage the capabilities of current generation smart phones and tablets. One such capability is short range communication technologies such as near field communication (NFC) or Bluetooth 4.0.

NFC is a set of standards for short-range wireless communication technology that employs magnetic field induction to enable communication between electronic devices in close proximity. The technology allows an NFC-enabled device to communicate with another NFC-enabled device or to retrieve information from an NFC tag. This enables users to perform intuitive, safe, contactless transactions, access digital content and connect electronic devices simply by touching or bringing devices into close proximity.

NFC operates in the standard unlicensed 13.56 MHz frequency band over a range of around 2-4 cm and offers data rates in the range of at least 106 kbits/s to 424 kbit/s. NFC standards cover communication protocols and data exchange formats and are based on existing radio frequency identification (RFID) standards. The standards include ISO/IEC 18092 and those defined by the NFC Forum, a non-profit industry organization which promotes NFC and certifies device compliance.

There are two modes of operation covered by the NFC standards: active and passive. In active mode, both communicating devices are capable of transmitting data. Each device generates alternately generates and deactivates their own electromagnetic field to transmit and receive data.

In passive mode, only one device, the initiator devices, generates a electromagnetic field, while the target device, typically an NFC tag, modulates the electromagnetic field to transfer data. The NFC protocol specifies that the initiating device is responsible for generating the electromagnetic field. In this mode, the target device may draw its operating power from the initiator-provided electromagnetic field.

Bluetooth is a set of specifications for common short range wireless applications. They are written, tested & maintained by the Bluetooth SIG. Bluetooth 4.0 is the most recent version of Bluetooth wireless technology. Bluetooth 4.0 introduced low energy technology to the Bluetooth Core Specification, enabling devices that can operate for months or even years on coin-cell batteries.

Bluetooth 4.0 operates in the same spectrum range (2402-2480 MHz) as previous Bluetooth technology, but uses a different set of channels. Instead of Bluetooth technology's seventy-nine 1 MHz wide channels, Bluetooth 4.0 has forty 2 MHz wide channels. Additionally, Bluetooth low energy technology uses a different frequency hopping scheme than prior Bluetooth technology. These improvements make Bluetooth 4.0 ideally suited for discrete data transfer as opposed to streaming as in previous Bluetooth technologies.

There is now a need to fully leverage the short range communication capabilities of smart portable devices, such as smart phones and tablets, to provide more robust control systems.

SUMMARY OF THE INVENTION

It is to be understood that both the general and detailed descriptions that follow are exemplary and explanatory only and are not restrictive of the invention.

DISCLOSURE OF INVENTION

Principles of the invention include devices, systems and methods for facilitating control of a device with a portable electronic device via near field communication. According to a first aspect, the present invention provides a system for providing individualized control comprising an NFC tag and a portable electronic device. The NFC tag encodes encoded information comprising a tag ID, control system information and one or more payloads. Each of the one or more payloads further comprises an action. The portable electronic device comprises an NFC interface, a network interface, a display, a memory encoding one or more processor-executable instructions and a processor configured to load the one or more processor-executable instructions when encoded from the memory. The one or more processor-executable instructions, when executed by the processor, cause acts to be performed comprising reading the encoded information from the NFC tag via the NFC interface of the portable electronic device, selecting a desired action from one of the one or more payloads, establishing communication with a control processor corresponding to the control system information via the network interface and transmitting the user ID and the desired action to the control processor.

According to a first aspect, the present invention provides a system for providing individualized control comprising an NFC tag, a portable electronic device and a control processor. The NFC tag encodes encoded information comprising a tag ID, an application identifier, a project ID, a control processor ID, and one or more payloads. Each of the one or more payloads further comprises an action. The portable electronic device comprises an NFC interface, a network interface, a display, a memory encoding one or more processor-executable instructions and a processor configured to load the one or more processor-executable instructions when encoded from the memory. The one or more processor-executable instructions, when executed by the processor, cause acts to be performed comprising reading the encoded information from the NFC tag via the NFC interface of the portable electronic device, opening a control application on the portable electronic device corresponding to the application ID, loading a project file corresponding to project file ID with the control application, selecting a desired action from one of the one or more payloads, establishing communication with a control processor corresponding to the control processor ID, and transmitting the user ID, the device ID, and the desired action to a control processor. The control processor comprises a network interface, a memory encoding one or more processor-executable instructions and a processor configured to load the one or more processor-executable instructions when encoded from the memory. The one or more processor-executable instructions, when executed by the processor, cause acts to be performed comprising determining whether there are more than one corresponding executables for the desired action according to the user ID, processing the desired action directly if there are not more than one corresponding executables for the desired action according to the user ID, determining whether there are more than one corresponding executables for the desired action according to the user ID and the device ID, demultiplexing the desired action based on the user ID if there are not more than one corresponding executables for the desired action according to the user ID and the device ID and demultiplexing the desired action based on the user ID and the device ID if there are more than one corresponding executables for the desired action according to the user ID and the device ID.

According to a third aspect, the present invention provides a method for providing individualized control. The method comprises the steps of providing an NFC tag encoding encoded information comprising an application identifier, a tag ID, control system information and one or more payloads, each of the one or more payloads further comprising an action, providing a portable electronic device identified by a device ID and a user ID and comprising an NFC interface, providing a control processor identified by a control processor ID, a network interface and a display, positioning the NFC interface of the portable electronic device within communication range of the NFC tag, reading the encoded information from the NFC tag via the NFC interface of the portable electronic device, opening a control application on the portable electronic device corresponding to the application identifier, selecting a desired action from one of the one or more payloads, establishing communication with the control processor corresponding to the control processor ID, and transmitting the user ID, the device ID, and the desired action to the control processor.

BRIEF DESCRIPTION OF DRAWINGS

The accompanying figures further illustrate the present invention.

The components in the drawings are not necessarily drawn to scale, emphasis instead being placed upon clearly illustrating the principles of the present invention. In the drawings, like reference numerals designate corresponding parts throughout the several views.

BRIEF DESCRIPTION OF THE SEVERAL VIEWS OF THE DRAWING

Figure 1:
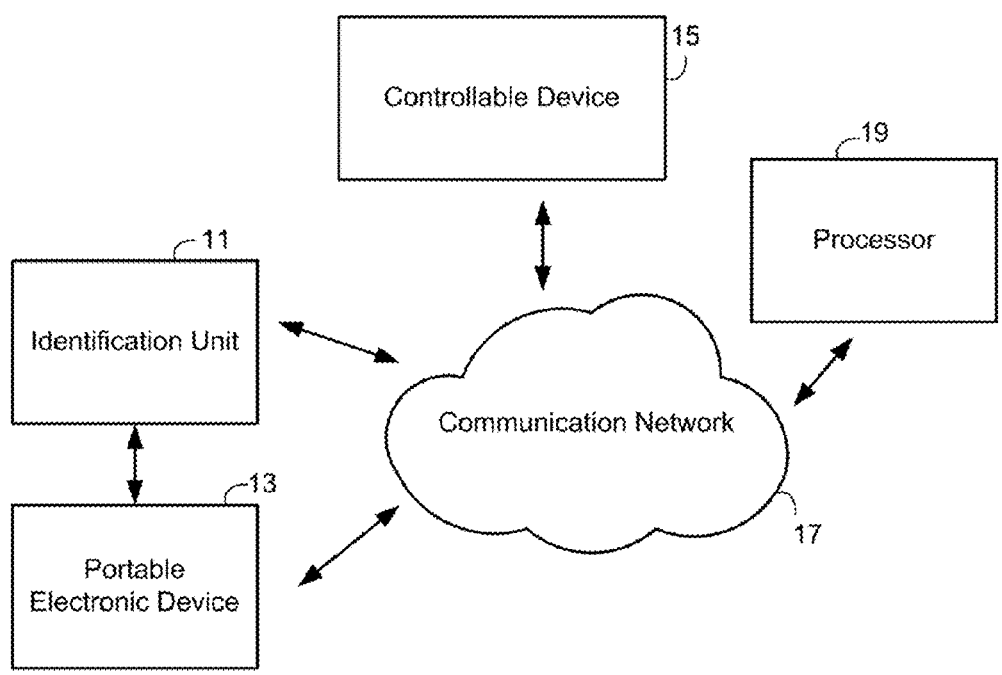

FIG. 1 illustrates a system for controlling a device on a control network, according to an illustrative embodiment of the invention.

Figure 2:
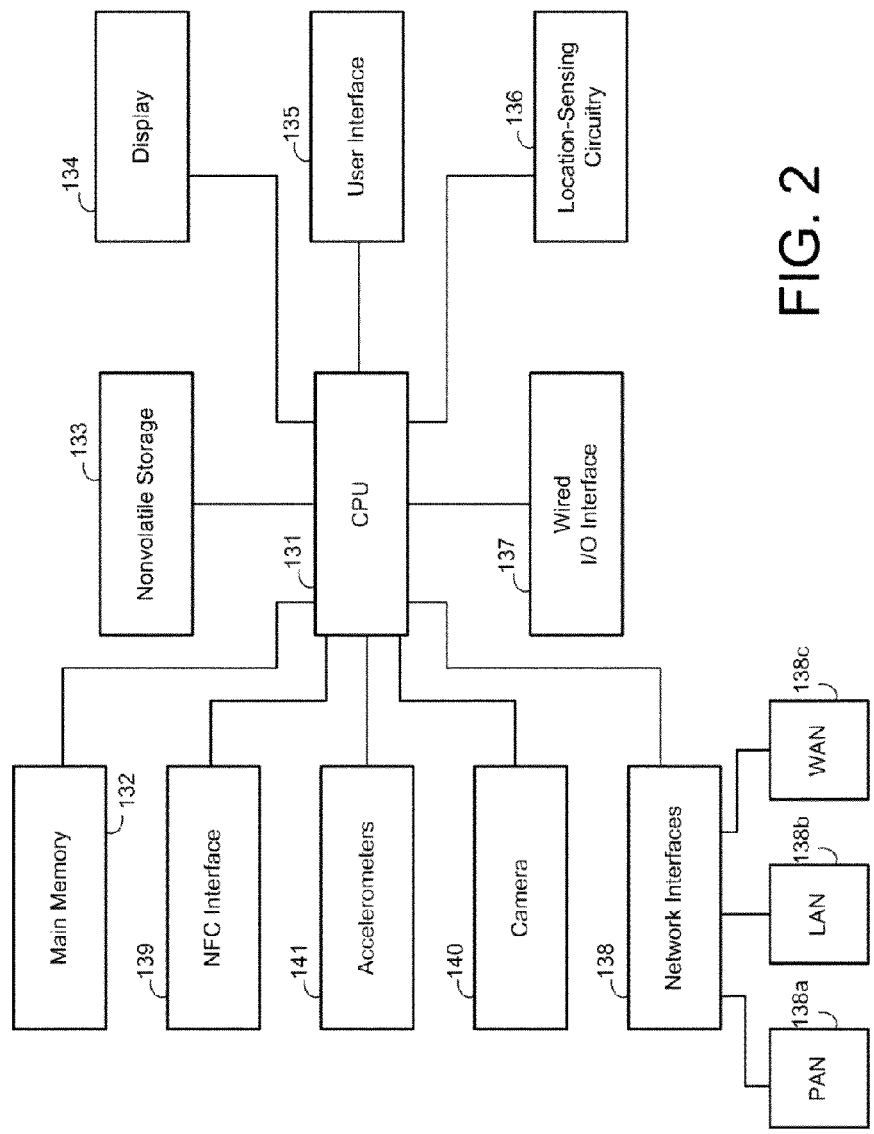

FIG. 2 is a block diagram depicting the portable electrical device of FIG. 1, according to an illustrative embodiment of the invention.

Figure 3:
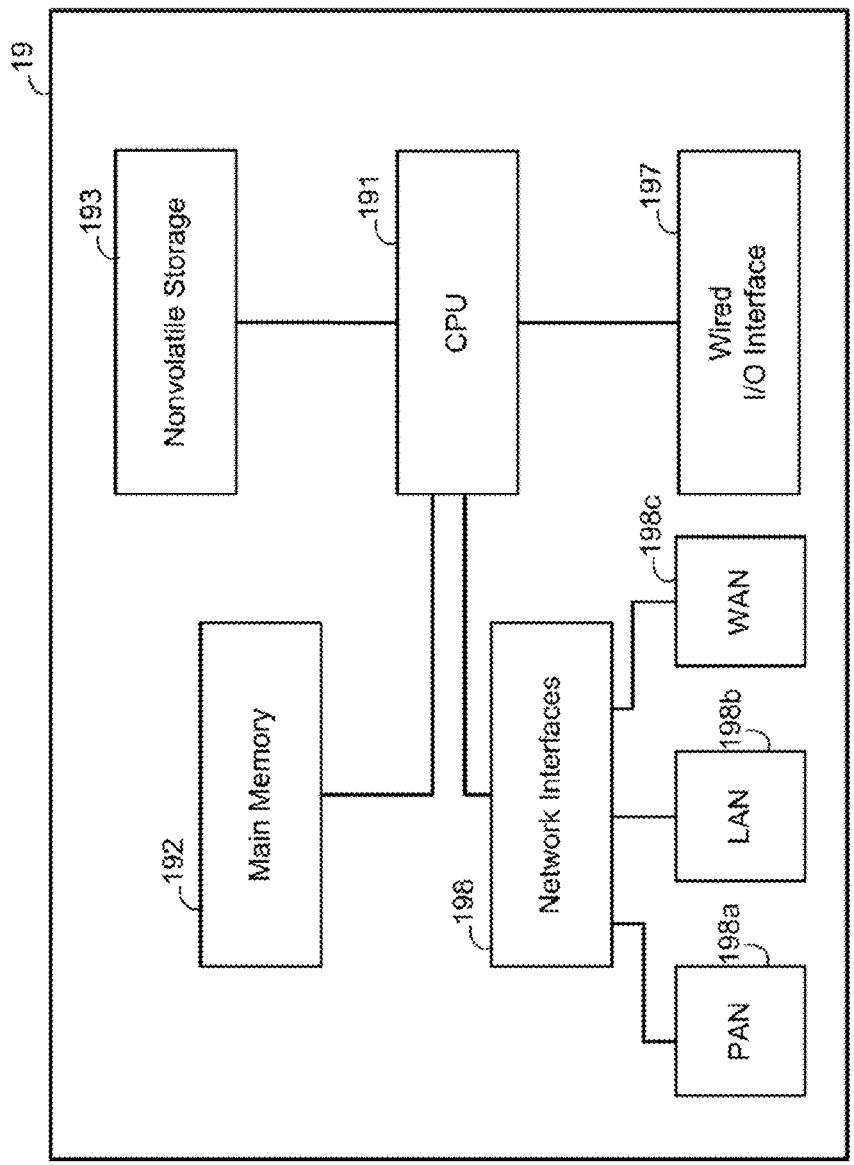

FIG. 3 is a block diagram depicting the control processor of FIG. 1 according to an illustrative embodiment of the invention.

Figure 4:
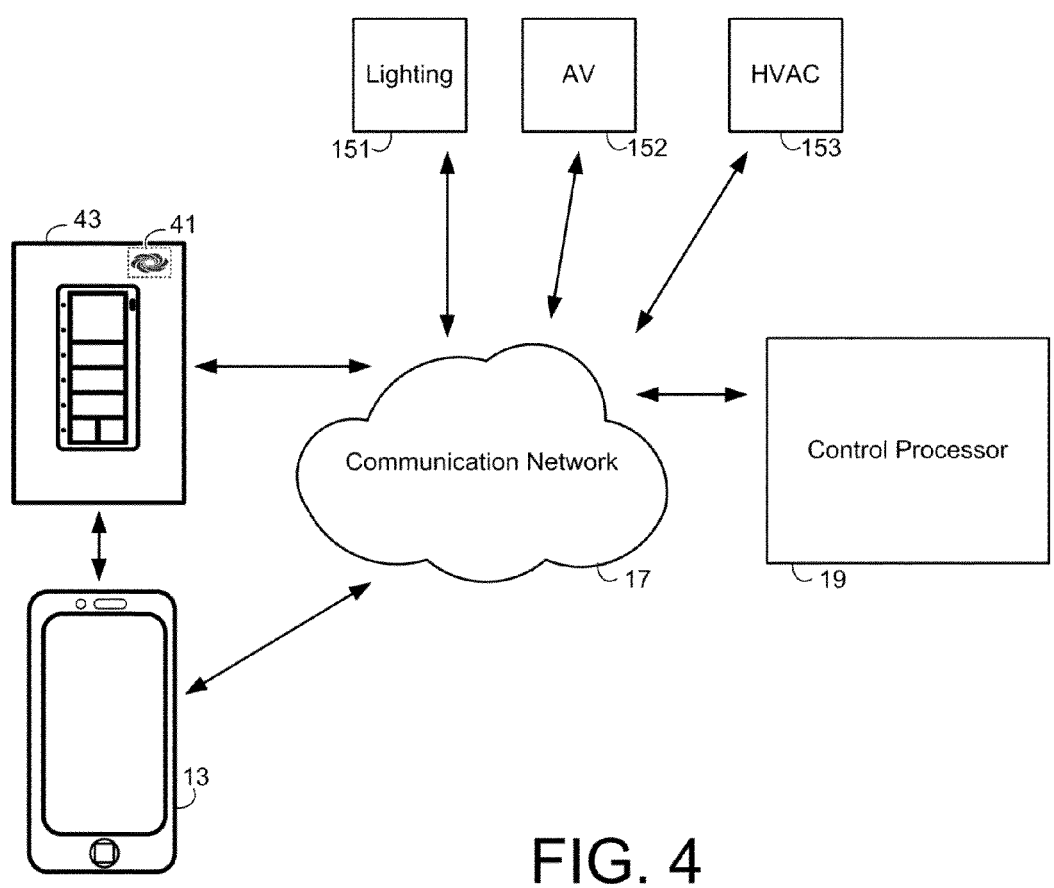

FIG. 4 illustrates an exemplary embodiment of a system for providing individualized control, according to an illustrative embodiment of the invention.

Figure 5:
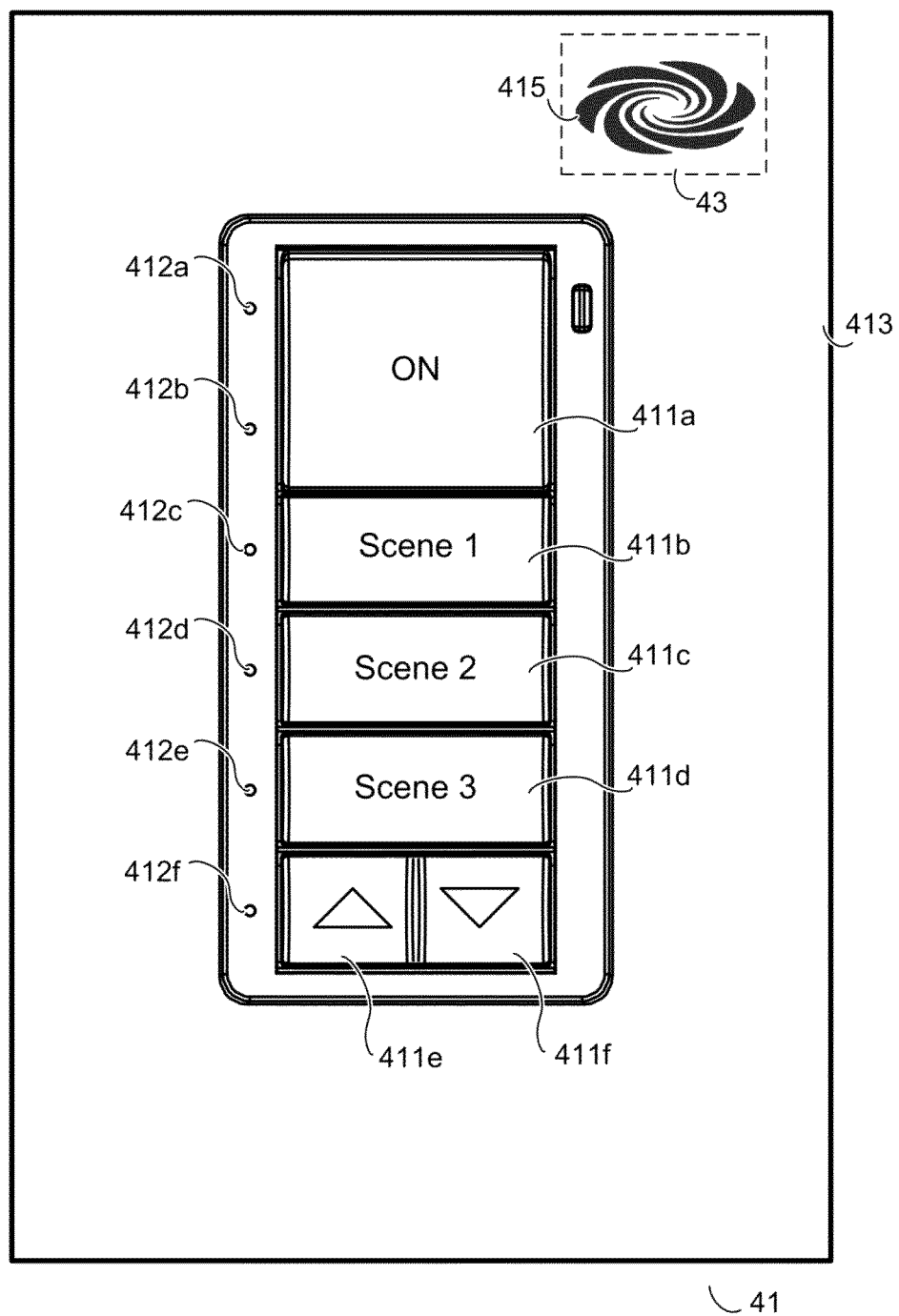

FIG. 5 shows the keypad of FIG. 4, according to an illustrative embodiment of the invention.

Figure 6A:
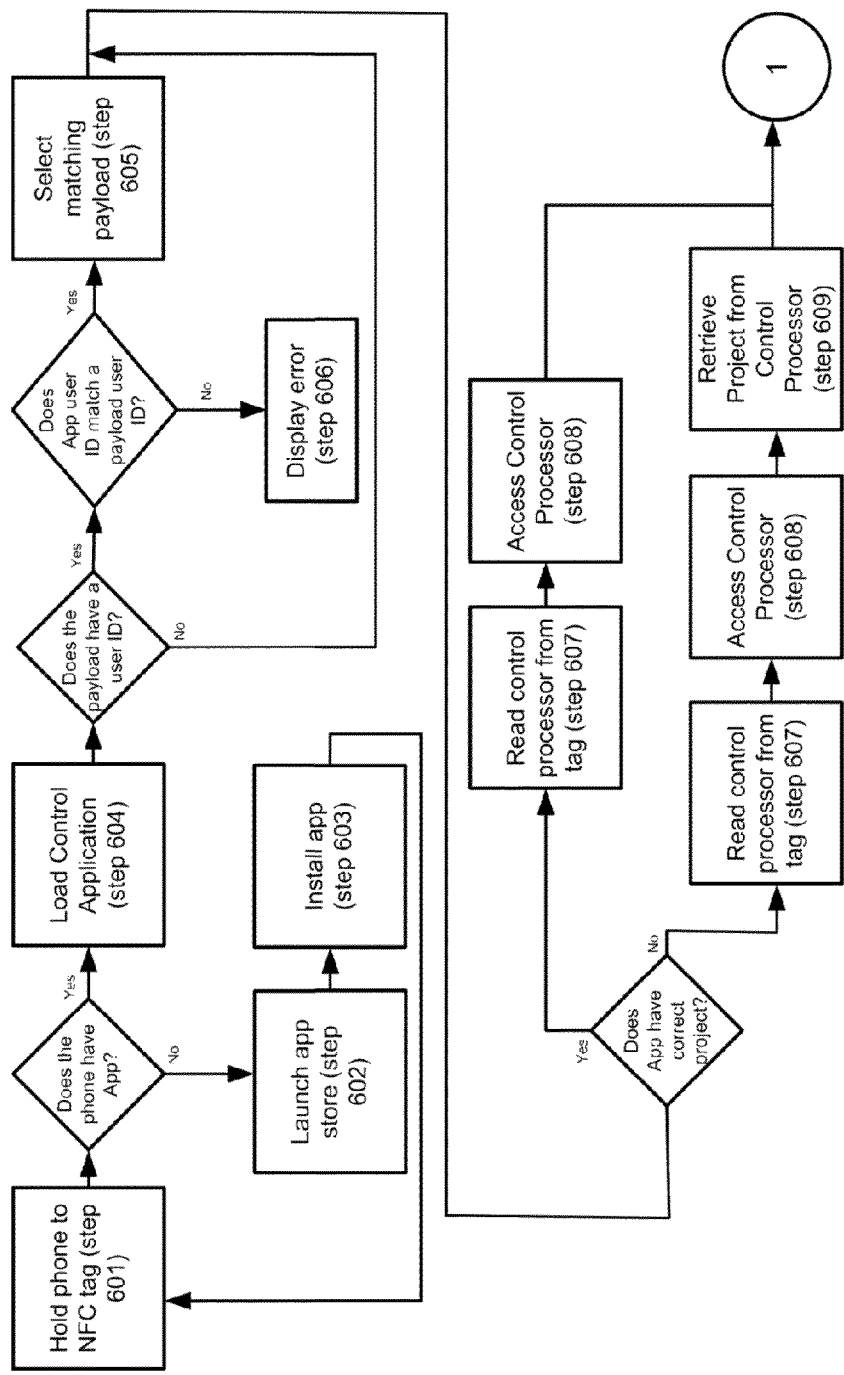
Figure 6B:
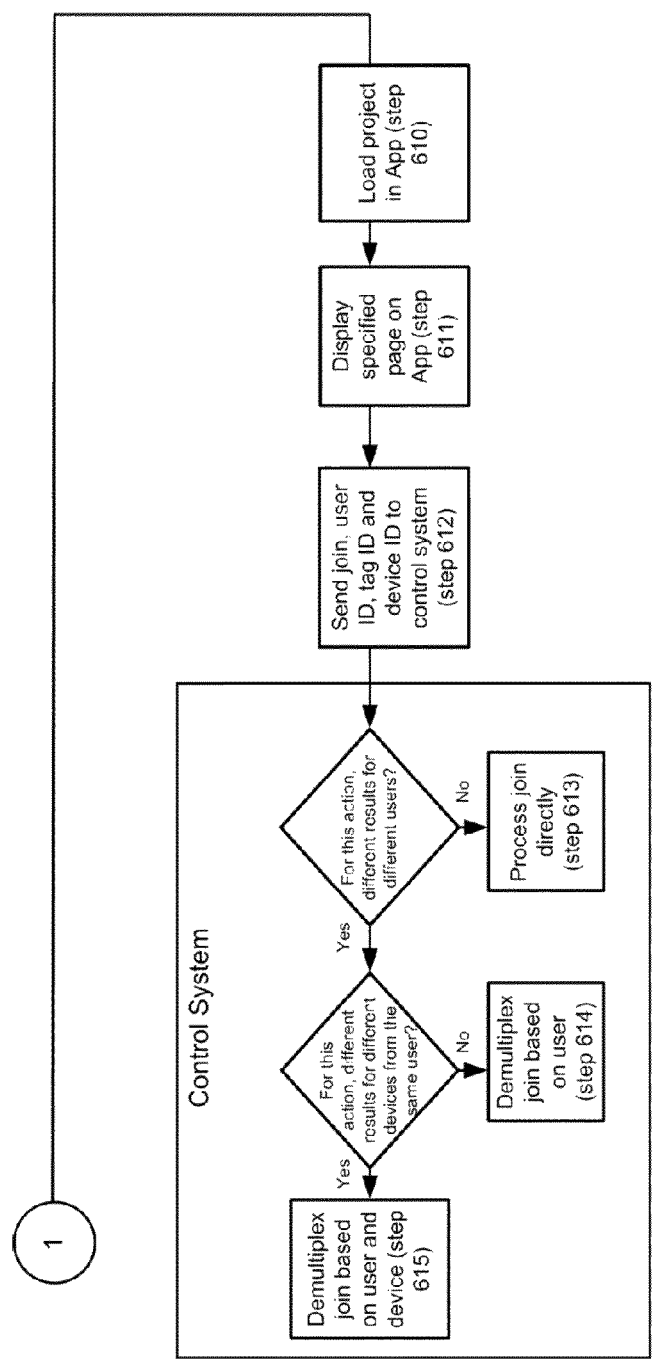

FIGS. 6A and 6B are a flowchart showing steps for performing a method of providing individualized control via near field communication, according to an illustrative embodiment of the invention.

Figure 7:
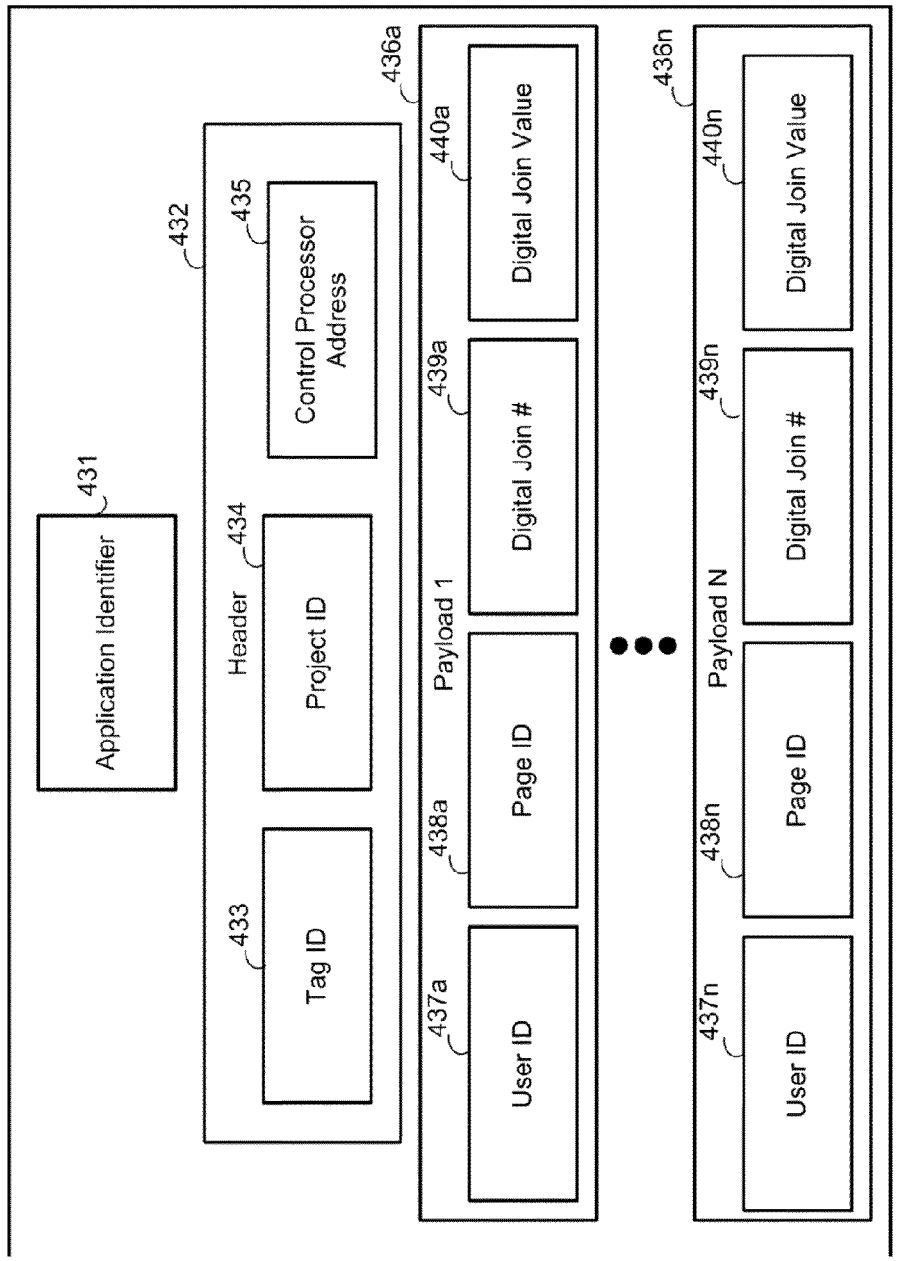

FIG. 7 is a visual representation of an NFC tag, according to an illustrative embodiment of the invention.

Figure 8:
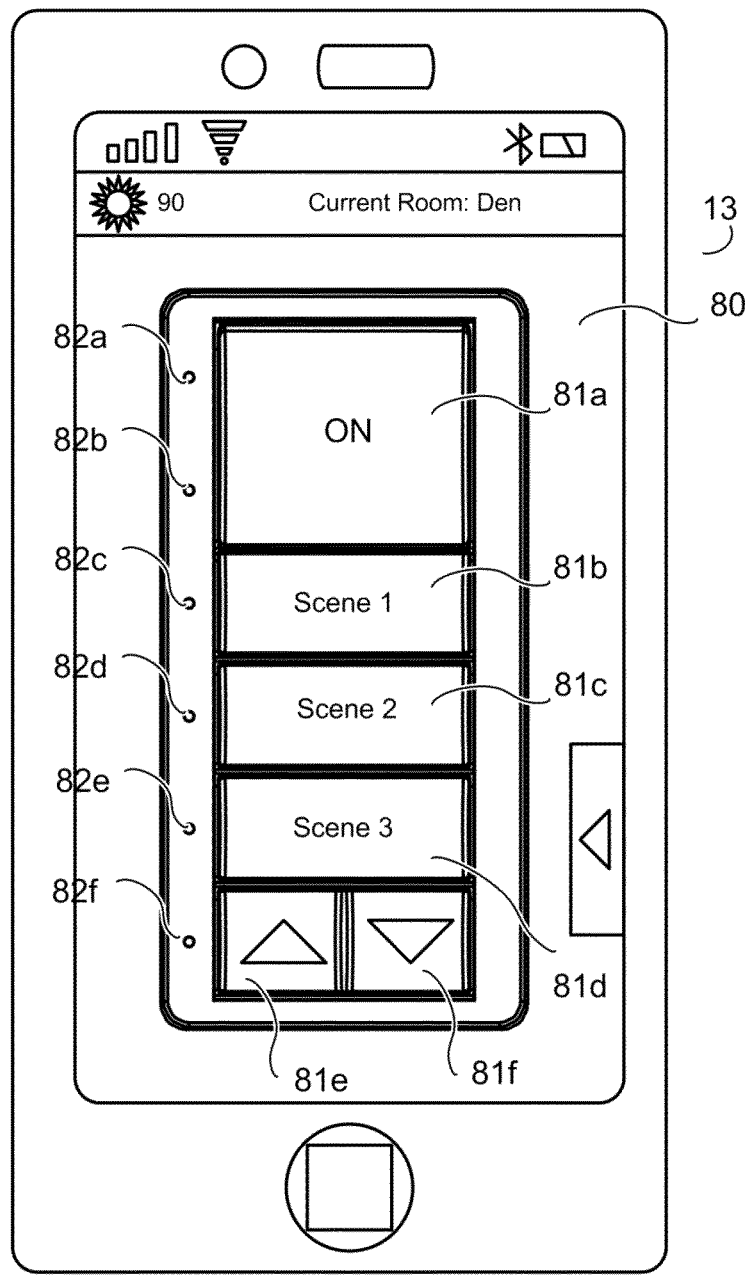

FIG. 8 is a schematic of a menu page that may be displayed on the portable electronic device for controlling one or more controllable devices, according to an illustrative embodiment of the invention.

Figure 9:
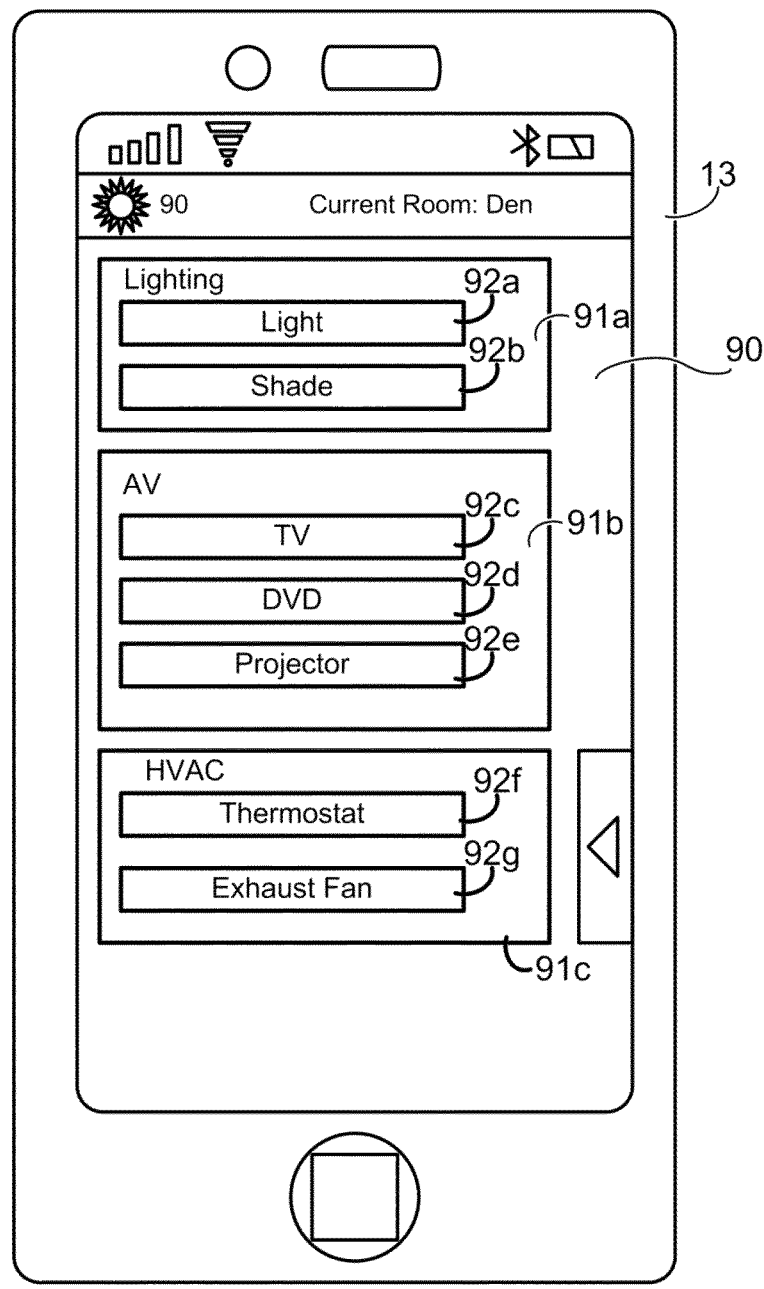

FIG. 9 is a schematic of a menu page that may be displayed on the portable electronic device for controlling one or more controllable devices in a zone, according to an illustrative embodiment of the invention.

Figure 10:
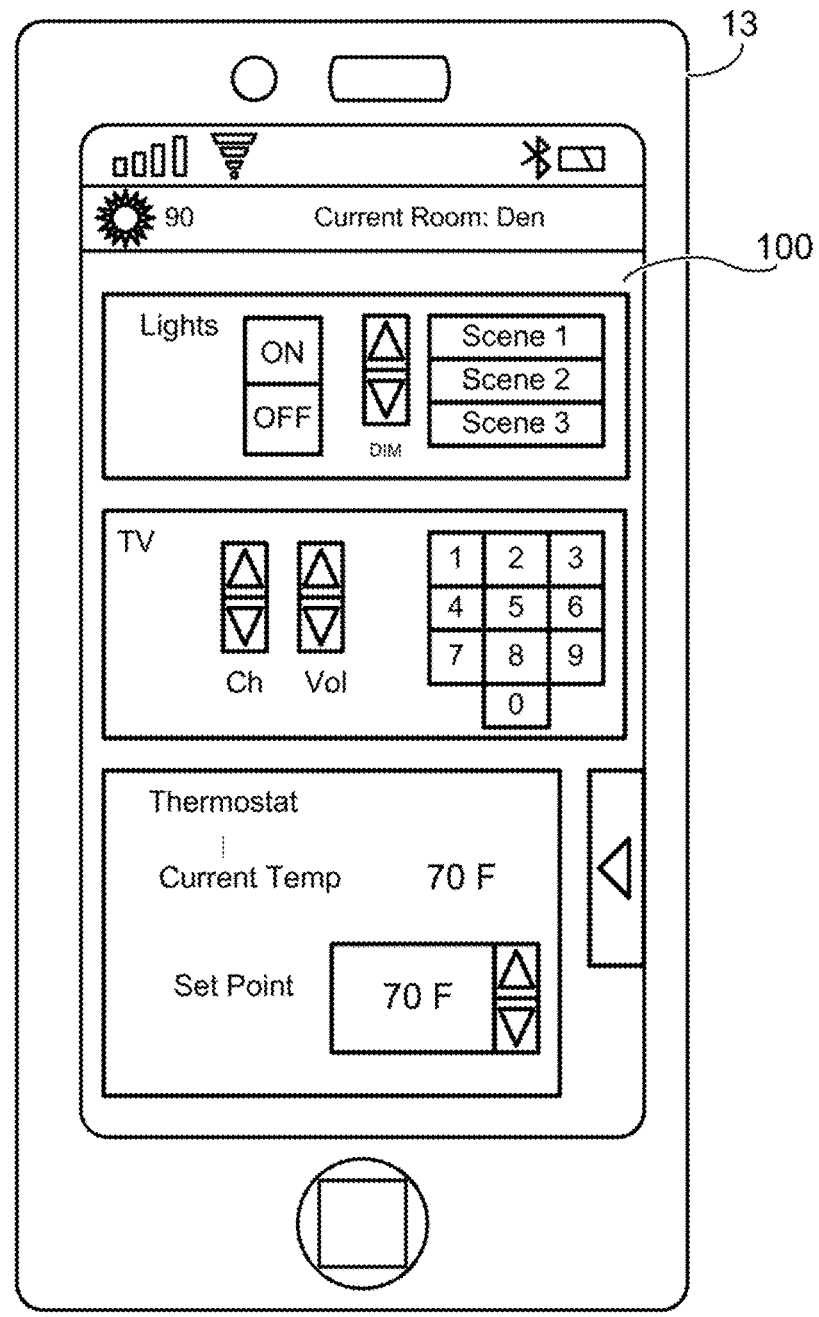

FIG. 10 is a schematic of a menu page that may be displayed on the portable electronic device for controlling one or more controllable devices in a zone, according to an illustrative embodiment of the invention.

Figure 11:
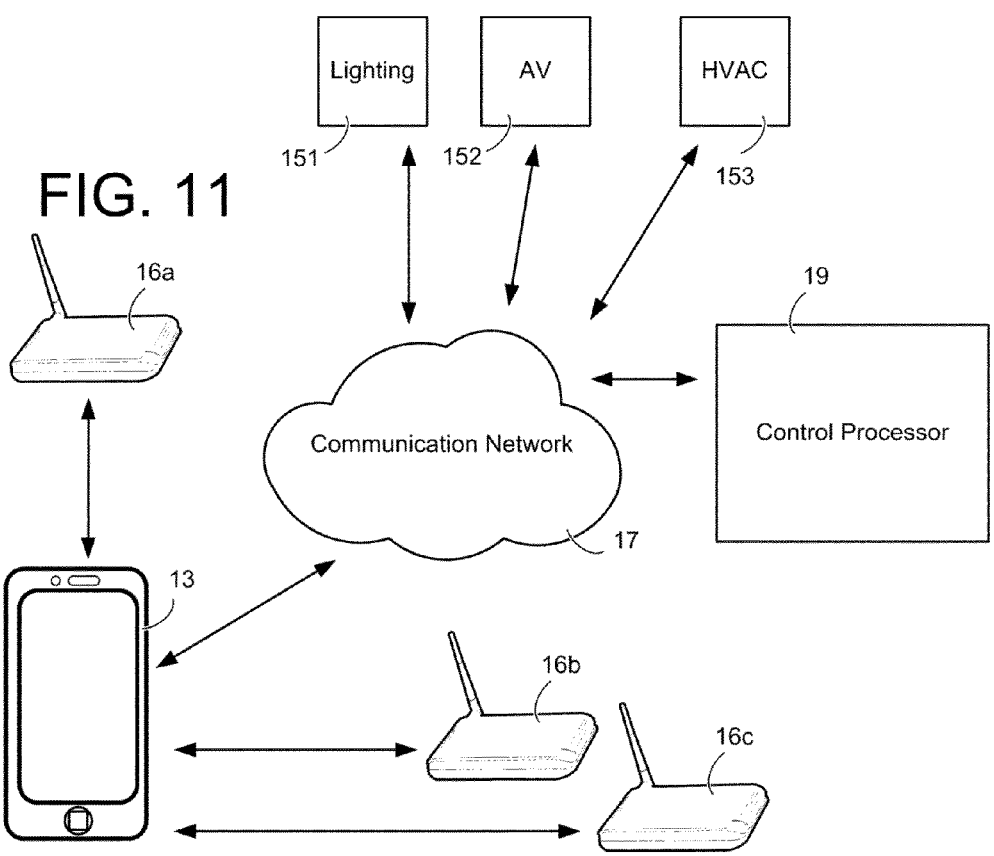

FIG. 11 illustrates an exemplary embodiment of a system for providing individualized control via communication with an RF beacon, according to an illustrative embodiment of the invention.

Figure 12:
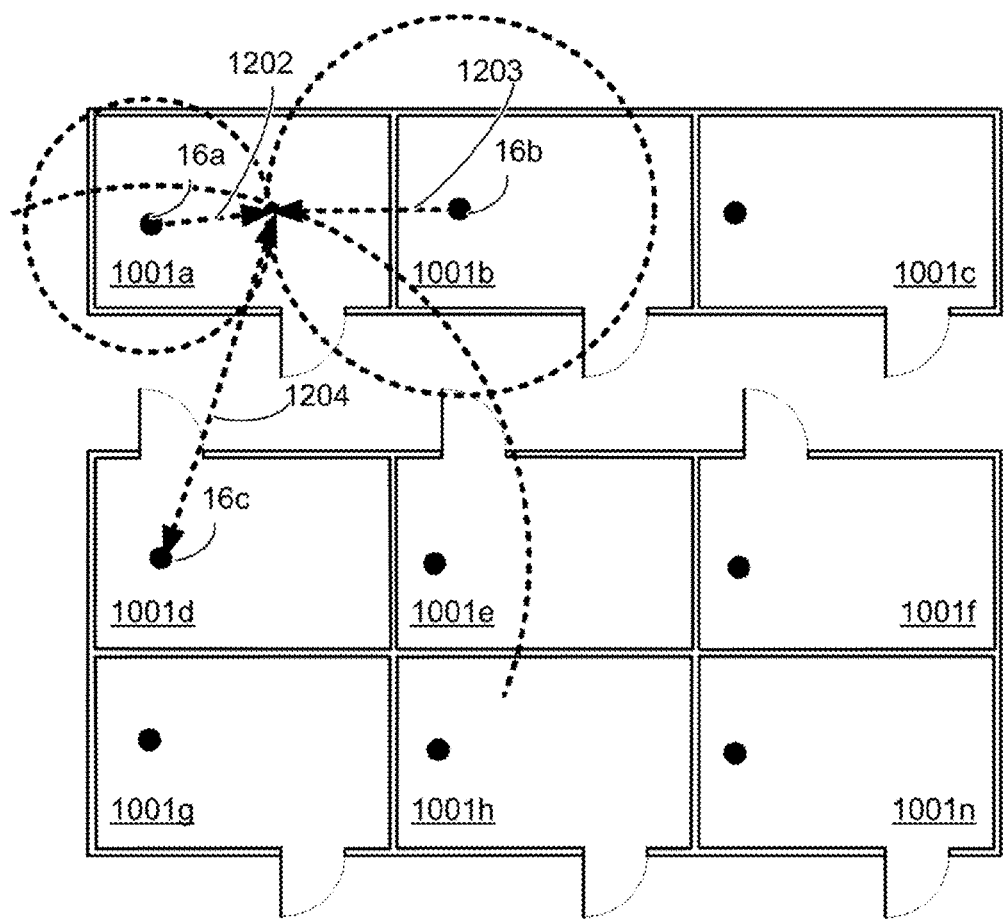

FIG. 12 shows a schematic of a facility with a plurality of rooms, each comprising an RF beacon, according to an illustrative embodiment of the invention.

Figure 13A:
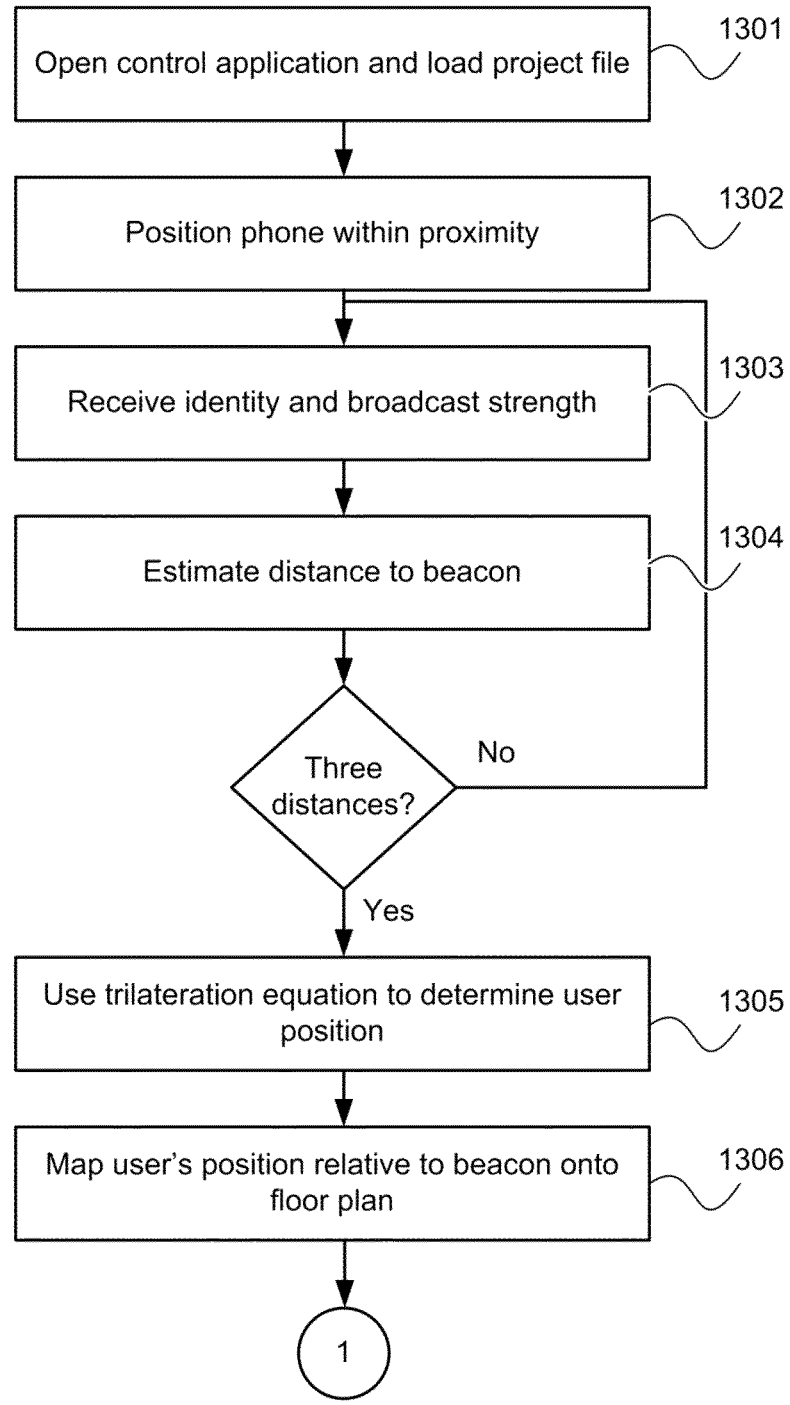
Figure 13B:
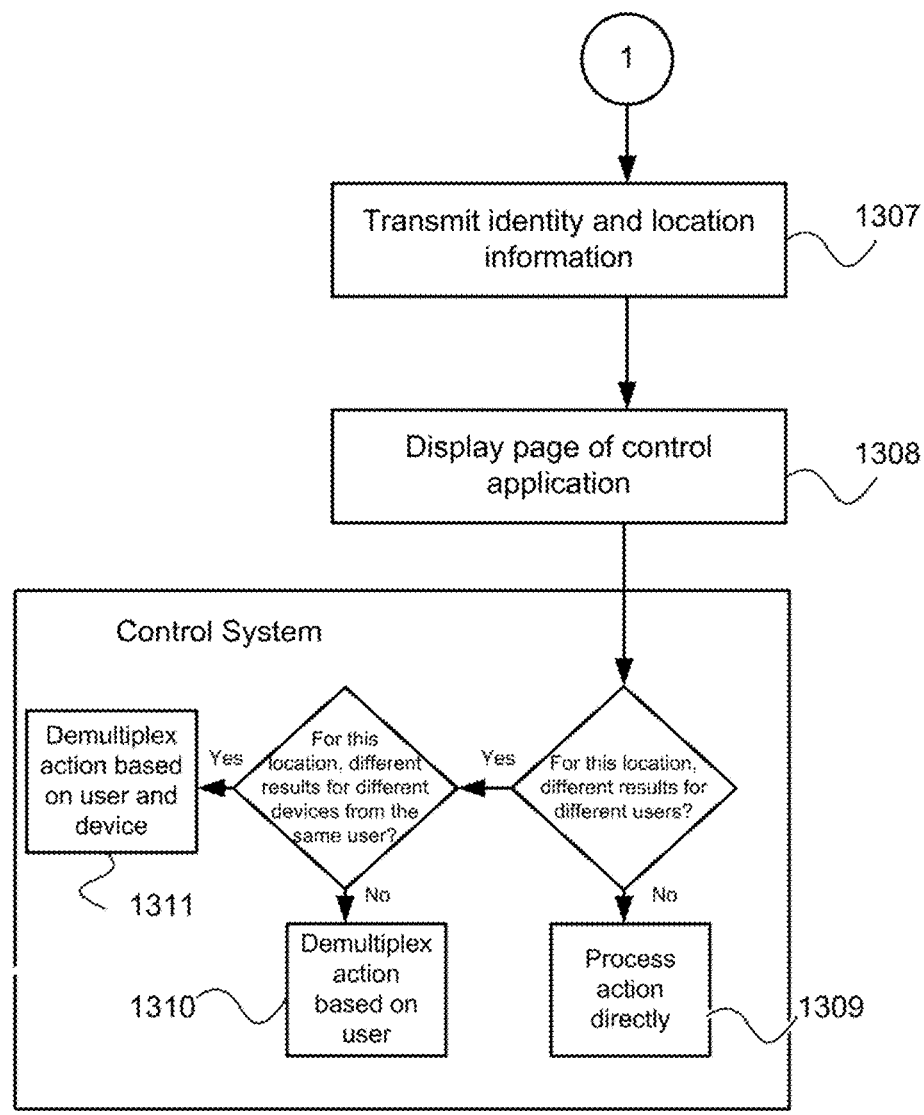

FIGS. 13A and 13B are a flowchart showing steps for performing a method of providing individualized control via communication with an RF beacon, according to an illustrative embodiment of the invention.

FIG. 14 illustrates an exemplary embodiment of a system for providing individualized control via communication with an RF beacon, according to an illustrative embodiment of the invention.

Figure 15A:
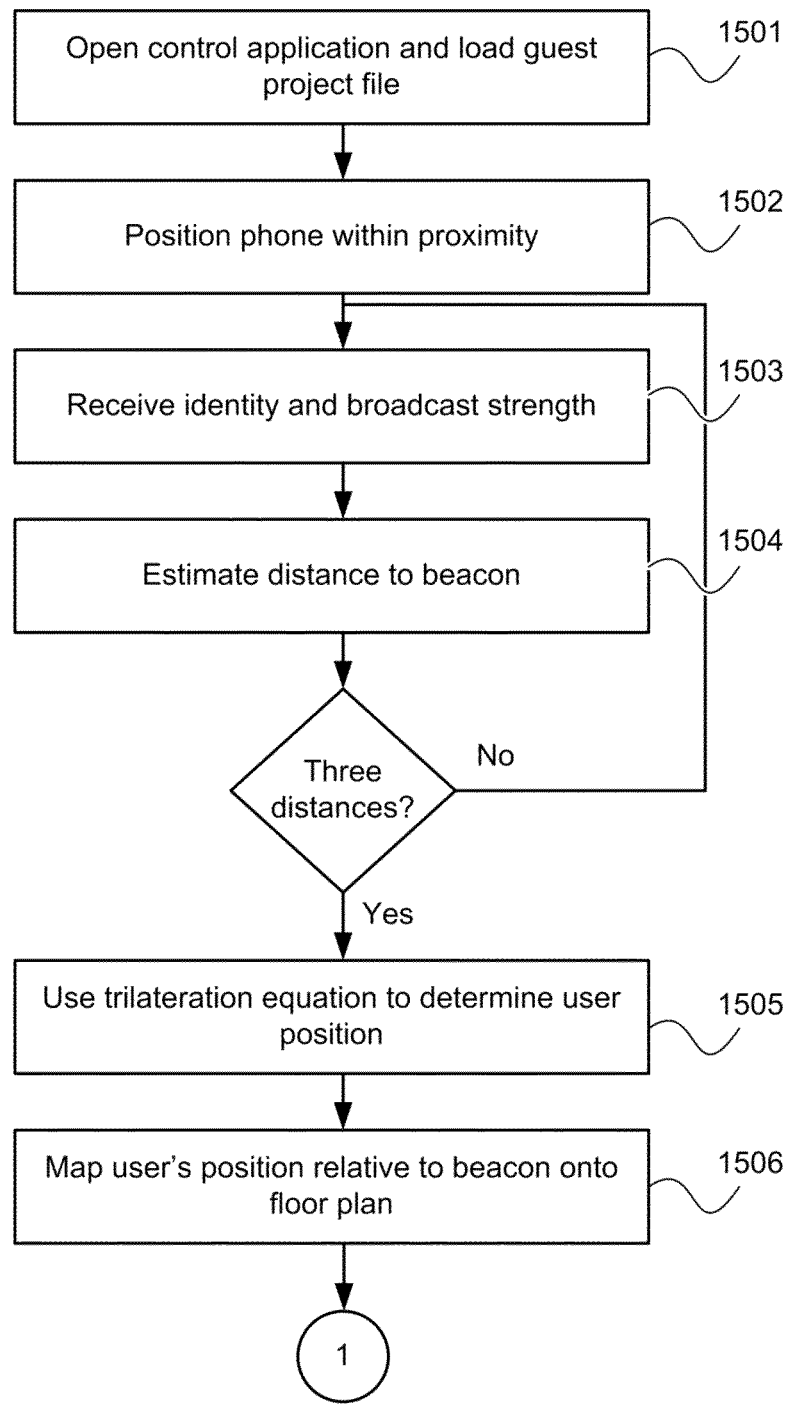
Figure 15B:
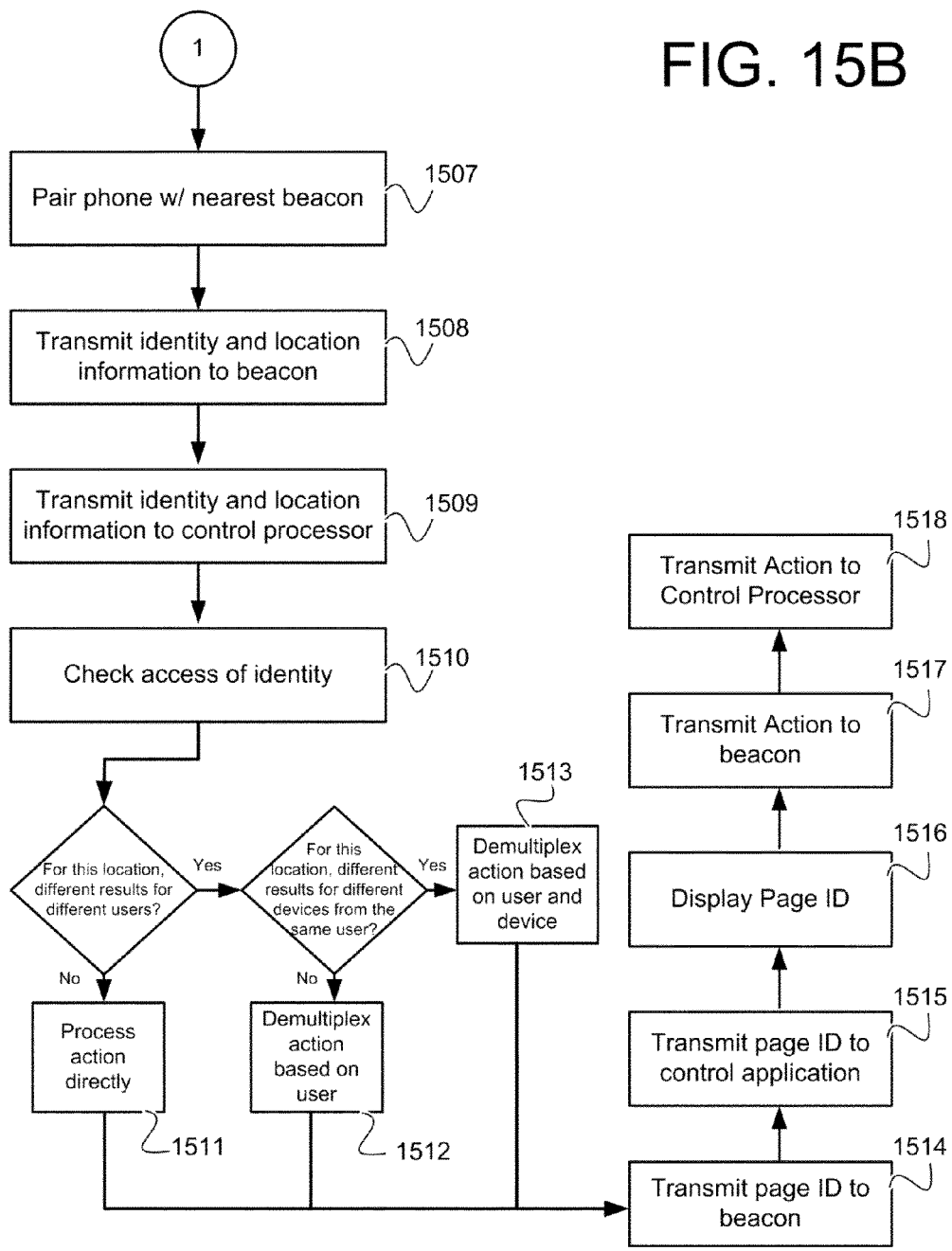

FIGS. 15A and 15B are a flowchart showing steps for performing a method of providing individualized control via communication with an RF beacon, according to an illustrative embodiment of the invention.

LIST OF REFERENCE NUMBERS FOR THE MAJOR ELEMENTS IN THE DRAWING

The following is a list of the major elements in the drawings in numerical order.
- 11 identification unit
- 13 portable electronic device
- 15 controllable device
- 16 RF beacon (collectively the RF beacons of 16A . . . 16N)
- 17 communication network
- 19 control processor
- 20 NFC communication channel
- 26 lighting dimmer
- 41 keypad
- 43 NFC tag
- 80 menu page
- 81 button icons (collectively the button icons of 81A-81F)
- 82 graphical visual indicators (collectively the graphical visual indicators of 82A-82F)
- 90 menu page 91 group (collectively the groups of 91A-91C)
92 selectable item (collectively the selectable items of 92A-92F)
100 menu page
131 central processing unit
132 main memory
133 nonvolatile storage
134 display
135 user interface
136 location sensing circuitry
137 wired i/o interface
138 network interface
138a personal area network interface
138b local area network interface
138c wide area network interface
139 near field communication interface
140 camera
141 accelerometers
151 lighting device
152 AV device
153 HVAC device
191 central processing unit
192 main memory
193 nonvolatile storage
197 wired i/o interface
198 network interface
198a personal area network interface
198b local area network interface
198c wide area network interface
411A-F buttons
412A-F visual indicators
413 faceplate
415 indicator marking
431 application identifier
432 header
433 tag ID (p/o header 432)
434 project file ID (p/o header 432)
435 control processor address (p/o header 432)
436 payload (collectively the payloads of 436a . . . 436n)
437 user ID (collectively the user IDs of 437a . . . 437n, p/o payload 436)
438 page ID (collectively the page IDs of 438a . . . 438n, p/o payload 436)
439 join number (collectively the join numbers of 439a . . . 439n, p/o payload 436)
440 join value (collectively the join values of 440a . . . 440n, p/o payload 436)
601 (step of) positioning the portable electronic device
602 (step of) launching application store
603 (step of) installing control application
604 (step of) loading control application on the portable electronic device
605 (step of) selecting matching payload
606 (step of) displaying error page
607 (step of) reading control processor ID from NFC tag
608 (step of) establishing communication with control processor
609 (step of) retrieving project file from control processor
610 (step of) loading project file in control application
611 (step of) displaying specified page on control application
612 (step of) sending action, user ID, tag ID and device ID to control system
613 (step of) processing action directly
614 (step of) demultiplexing action based on user
615 (step of) demultiplexing action based on user and device
1201 room (collectively the rooms of 1201a-1201n)
1202 first range
1203 second range
1204 third range
1301 (step of) opening control application and loading project file
1302 (step of) positioning portable electronic device within proximity of RF beacons
1303 (step of) receiving identity and broadcast strength
1304 (step of) estimating distance to an RF beacon
1305 (step of) using trilateration equation to determine user position
1306 (step of) mapping user's position relative to RF beacon onto floor plan
1307 (step of) transmitting identity and location information to control processor
1308 (step of) displaying page of control application on portable electronic device
1309 (step of) determining control according to location
1310 (step of) determining control according to location and user
1311 (step of) determining control according to location, user and device
1501 (step of) opening control application and loading guest project file
1502 (step of) positioning portable electronic device within proximity of RF beacons
1503 (step of) receiving identity and broadcast strength
1504 (step of) estimating distance to an RF beacon
1505 (step of) using trilateration equation to determine user position
1506 (step of) mapping user's position relative to RF beacon onto floor plan
1507 (step of) pairing portable electronic device with nearest RF beacon
1508 (step of) transmitting identity and location information to RF beacon
1509 (step of) transmitting identity and location information to control processor
1510 (step of) checking access of identity
1511 (step of) determining control according to location
1512 (step of) determining control according to location and user
1513 (step of) determining control according to location, user and device
1514 (step of) transmitting page ID to RF beacon
1515 (step of) transmitting page ID to control application
1516 (step of) displaying page ID on portable electronic device
1517 (step of) transmitting action to RF beacon
1518 (step of) transmitting action to control processor

DETAILED DESCRIPTION OF THE INVENTION

The present invention is generally implemented as systems, methods and devices for providing individualized control. The present invention provides individual control based on the identity, operable device and location of an individual. Short range communication technologies such as near field communication (NFC) and Bluetooth 4.0 in a portable electronic device are leveraged to detect and identify the user and portable electronic device as well as initiate the individualized control. This control can include actions performed by the portable electronic device, such as opening a control application and displaying a specific page of the control application, or by a control network, such as by executing one or more programmed control functions.

While the present invention is described in embodiments herein in the context of a control system incorporating one or more controllable audio-visual (AV) devices, one or more lighting control devices, one or more heating, ventilation and air-conditioning (HVAC) devices and a smart mobile phone, it is not limited thereto, except as may be set forth expressly in the appended claims. The present invention is suited for providing control of various devices found in commercial and residential structures and configured for being controlled via wired or wireless means. Similarly, the portable electronic device is not limited to a smart phone and may include tablets, remote controls, personal digital assistants (PDA) and other similar devices.

FIG. 1 illustrates an exemplary embodiment of a system for providing individualized control, according to an illustrative embodiment of the invention. It should be noted that the exemplary embodiment of the system 10 illustrated in FIG. 1 may be varied in one or more aspects without departing from the spirit and scope of the teachings disclosed herein.

The system comprises the following elements: an identification unit 11, a portable electronic device 13, a controllable device 15, a communication network 17 and a control processor 19.

In an embodiment of the invention, the identification unit 11 is an NFC tag. The NFC tag encodes information identifying the tag, an associated control application and associated control processor. In an embodiment of the invention, the NFC tag is configured to be read by an NFC interface in a passive communication mode. In this mode, the NFC tag draws its operating power from the electromagnetic field provided by the NFC interface of the initiator device. Advantageously, the NFC tag does not require a power supply for operation.

The NFC tag may be a stand-alone device associated with a location or may be associated with a particular device in the location. For example, the NFC tag may be associated with a control point such as a keypad, a switch, a touchpanel, a remote control, a thermostat or any other similar device for providing control access to a controllable device 15. Alternatively, the NFC tag may be associated with a location or zone of the facility. For example, the NFC tag may be associated with the kitchen and one or more controllable devices 15 associated with the kitchen. The controllable devices 15 associated with the kitchen may physically be within the kitchen or control an element pertaining to the kitchen such as light, media or temperature. Further, the NFC tag may be physically integrated with another device such as by physically affixing it on or within a device or the NFC tag may be a standalone device such as a sticker affixed to a wall or structure of the facility. Due to keypads prevalence in buildings and their near standard placement near doorways and traditional control functions, keypads provide a well-known and familiar point for placing NFC tags.

In another embodiment of the invention, the identification unit 11 is one or more RF beacons configured for communicating according to Bluetooth 4.0 protocols. The one or more RF beacons may be configured for transmitting their identity and broadcast signal strength to allow location detection by comparing the broadcast signal strength to the received signal strength. Accordingly, a control application running on the portable electronic device may estimate a distance to an RF beacon in a known location.

In an embodiment of the invention, a plurality of RF beacons are deployed throughout a facility in known locations. The control application is configured to detect the location of the portable electronic device by estimating a distance to the location of the three closest RF beacons and calculating its position via trilateration. The location may then be mapped to a room or zone within the facility.

The portable electronic device 13 may be a smart phone, tablet, remote control, personal digital assistant or any other electronic device configured for storing a control application and communicating on a control network via RF communication protocols. For example, the portable electronic device 13 may be a smart phone running the Crestron Mobile Pro® control application available from Crestron Electronics, Inc. The control application may be downloaded and stored in the portable electronic device 13 from an application marketplace such as the Google Play application marketplace, the iTunes® application marketplace or other similar marketplace.

FIG. 2 is a block diagram depicting the portable electronic device 13, according to an illustrative embodiment of the invention. The portable electronic device 13 may include at least one central processing unit (CPU) 131. For example, the CPU 131 may represent one or more microprocessors, and the microprocessors may be "general purpose" microprocessors, a combination of general and special purpose microprocessors, or application specific integrated circuits (ASICs). Additionally or alternatively, the CPU 131 may include one or more reduced instruction set (RISC) processors, video processors, or related chip sets. The CPU 131 may provide processing capability to execute an operating system, run various applications, and/or provide processing for one or more of the techniques described herein. Applications that may run on the portable electronic device 13 may include, for example, software for managing and playing audiovisual content, software for managing a calendar, software for controlling telephone capabilities, software for controlling other electronic devices via a control network as noted above.

A main memory 132 may be communicably coupled to the CPU 131, which may store data and executable code. The main memory 132 may represent volatile memory such as RAM, but may also include nonvolatile memory, such as read-only memory (ROM) or Flash memory. In buffering or caching data related to operations of the CPU 131, the main memory 132 may store data associated with applications running on the portable electronic device 13.

The portable electronic device 13 may also include nonvolatile storage 133. The nonvolatile storage 133 may represent any suitable nonvolatile storage medium, such as a hard disk drive or nonvolatile memory, such as Flash memory. Being well-suited to long-term storage, the nonvolatile storage 133 may store data files such as media, software (e.g., for implementing functions on the portable electronic device 13), preference information (e.g., media playback preferences). It should be appreciated that data associated with controlling certain other electronic devices, such as a project file for a control application may be saved in the nonvolatile storage 133, as discussed further below.

A display 134 may display images and data for the portable electronic device 13. It should be appreciated that only certain embodiments may include the display 134. The display 134 may be any suitable display 134, such as liquid crystal display (LCD), a light emitting diode (LED) based display, an organic light emitting diode (OLED) based display, a cathode ray tube (CRT) display, or an analog or digital television. In some embodiments, the display 134 may function as a touch screen through which a user may interact with the portable electronic device 13.

The portable electronic device 13 may further include a user interface 135. The user interface 135 may represent indicator lights and user input structures, but may also include a graphical user interface (GUI) on the display 134. In practice, the user interface 135 may operate via the CPU 131, using memory from the main memory and long-term storage in the nonvolatile storage. In an embodiment lacking the display 134, indicator lights, sound devices, buttons, and other various input/output (I/O) devices may allow a user to interface with the portable electronic device 13. In an embodiment having a GUI, the user interface 135 may provide interaction with interface elements on the display 134 via certain user input structures, user input peripherals such as a keyboard or mouse, or a touch sensitive implementation of the display 134.

As should be appreciated, one or more applications may be open and accessible to a user via the user interface 135 and displayed on the display 134 of the portable electronic device 13. The applications may run on the CPU 131 in conjunction with the main memory 132, the nonvolatile storage 133, the display 134, and the user interface 135. As will be discussed below, instructions stored in the main memory 132, the nonvolatile storage 133, or the CPU 131 of the portable electronic device 13 may enable a user to determine a location via information received over an NFC communication channel 20 or Bluetooth communication channel and control and monitor another electronic device via a communication network. As such, it should be appreciated that the instructions for carrying out such techniques on the portable electronic device 13 may represent a stand-alone application, a function of the operating system of the portable electronic device 13, or a function of the hardware of the CPU 131, the main memory 132, the nonvolatile storage 133, or other hardware of the portable electronic device 13.

One such application that may be open and accessible to the user is a control application for enabling communication with a control system. For example, the control application may be Mobile Pro® available from Crestron Electronics, Inc. of Rockleigh, N.J. Crestron Mobile Pro® uses mobile broadband or Wi-Fi communication to communicate with a control network via a local area network or wide area network. Mobile Pro® allows users to remotely control and monitor devices of the control system with a portable electronic device 13. As an example, a user may control and monitor the status of rooms and devices, select media to be played on devices, adjust volume, climate, lighting and security settings of devices on the control network.

The control application, such as Crestron Mobile Pro® or other similar control application may be downloaded from an application marketplace such as from the Google Play application marketplace or the Apple iTunes@ application marketplace. Upon opening, the control application may communicate with a control system to download a project file of the control system.

The project file provides the instructions allowing the control application to communicate with the target control system. Further, the project file comprises the menu pages of the control application corresponding to the locations and controllable devices. For example, the control application may display one or more menu pages identified by page IDs for controlling controllable devices 15 on the control network according to the project file. The menu pages comprise selectable elements corresponding to control functions as defined in the project file.

In an embodiment of the invention, a programmer designs menu pages corresponding to and according to locations and controllable devices and attaches functions to the menu pages, such as by assigning join values and join numbers to selectable elements on the menu pages. The join values and join numbers are understood by the control application and the control processor and correspond to control functions executed by the control processor. The project file may be programmed with a computer language such as SIMPL or Crestron Studio, each available from Crestron Electronics, Inc. of Rockleigh, N.J. The project file may be custom programmed for an area by a programmer or may be distributed by a manufacturer as a common project file.

The control application displays a series of menu pages comprising selectable elements and graphical elements. One or more of the selectable elements may correspond to control functions of a controllable device 15. The portable electronic device 13 transmits control signals to the control system according to the control functions selected by the user. Additionally, the control system may communicate with the portable electronic device 13, such as by providing feedback signals to the portable electronic device 13. In one embodiment, the portable electronic device 13 communicates with a control processor running a logic engine via a gateway. The control processor in turn communicates with the controllable electronic device to execute the control.

In certain embodiments, the portable electronic device 13 may include location sensing circuitry 136. The location sensing circuitry 136 may represent global positioning system (GPS) circuitry, but may also represent one or more algorithms and databases, stored in the nonvolatile storage or main memory and executed by the CPU 131, which may be used to infer location based on various observed factors. For example, the location sensing circuitry may represent an algorithm and database used to approximate geographic location based on the detection of local 802.11x (Wi-Fi) networks or nearby cellular phone towers.

The portable electronic device 13 may also include a wired input/output (I/O) interface 137 for a wired interconnection between one electronic device and another electronic device. The wired I/O interface 137 may represent, for example, a universal serial bus (USB) port or an IEEE 1394 or FireWire® port, but may also represent a proprietary connection. Additionally, the wired I/O 137 interface may permit a connection to user input peripheral devices, such as a keyboard or a mouse.

An infrared (IR) interface may enable the portable electronic device 13 to receive and/or transmit signals with infrared light. By way of example, the IR interface may comply with an infrared IrDA specification for data transmission. Alternatively, the IR interface may function exclusively to receive control signals or to output control signals. In this way, the portable electronic device 13 may issue signals to control other electronic devices that may lack other interfaces for communication.

One or more network interfaces 138 may provide additional connectivity for the portable electronic device 13. The network interfaces 138 may represent, for example, one or more network interface cards (NIC) or a network controller. In certain embodiments, the network interface 138 may include a personal area network (PAN) interface 138a. The PAN interface 138a may provide capabilities to network with, for example, a Bluetooth® network, an IEEE 802.15.4 (e.g., ZigBee) network, or an ultra wideband network (UWB). As should be appreciated, the networks accessed by the PAN interface 138a may, but do not necessarily, represent low power, low bandwidth, or close range wireless connections. The PAN interface 138*a* may permit one electronic device to connect to another local electronic device via an ad-hoc or peer-to-peer connection. However, the connection may be disrupted if the separation between the two electronic devices exceeds the range of the PAN interface.

The network interface may also include a local area network (LAN) interface 138*b*. The LAN interface 138*b* may represent an interface to a wired Ethernet-based network, but may also represent an interface to a wireless LAN, such as an IEEE 802.11x wireless network. The range of the LAN interface 138*b* may generally exceed the range available via the PAN interface 138*a*. Additionally, in many cases, a connection between two electronic devices via the LAN interface 138*b* may involve communication through a network router or other intermediary device.

For some embodiments of the portable electronic device 13, the network interfaces 138 may include the capability to connect directly to a wide area network (WAN) via a WAN interface 138*c*. The WAN interface 138*c* may permit a connection to a cellular data network, such as the Enhanced Data rates for GSM Evolution (EDGE) network or other 3G network. When connected via the WAN interface 138*c*, the portable electronic device 13 may remain connected to the Internet and, in some embodiments, to another electronic device, despite changes in location that might otherwise disrupt connectivity via the PAN interface 138*a* or the LAN interface 138*b*. As will be discussed below, the wired I/O interface 137 and the network interfaces 138 may represent high-bandwidth communication channels for transferring user data using the simplified data transfer techniques discussed herein.

The portable electronic device 13 may also include a near field communication (NFC) interface 139. The NFC interface 139 may allow for extremely close range communication at relatively low data rates (e.g., 464 kb/s), and may comply with such standards as ISO 18092 or ISO 21521, or it may allow for close range communication at relatively high data rates (e.g., 560 Mbps), and may comply with the TransferJet® protocol. The NFC interface 139 may have a range of approximately 2 to 4 cm. The close range communication with the NFC interface 139 may take place via magnetic field induction, allowing the NFC interface 139 to communicate with other NFC interfaces or to retrieve information from tags having radio frequency identification (RFID) circuitry. As discussed below, the NFC interface 139 may provide a manner of initiating or facilitating a transfer of user data from one electronic device to another electronic device.

The portable electronic device 13 may also include a camera 140. With the camera 140, the portable electronic device 13 may obtain digital images or videos. In combination with optical character recognition (OCR) software, barcode-reading software, or matrix-code-reading software running on the portable electronic device 13, the camera 140 may be used to input data from printed materials having text or barcode information. Such data may include information indicating how to control another device from a matrix barcode that may be printed on the other device, as described below.

In certain embodiments of the portable electronic device 13, one or more accelerometers 141 may sense the movement or orientation of the portable electronic device 13. The accelerometers 141 may provide input or feedback regarding the position of the portable electronic device 13 to certain applications running on the CPU 131.

The control system is a network for, among other things, controlling and monitoring various devices and environmental conditions throughout a structure. The control system may comprise one or more of the following controllable devices 15: A/V devices including but not limited to content sources, content sinks, video recorders, audio receivers, speakers, and projectors; lighting devices including but not limited to lamps, ballasts, light emitting diode (LED) drivers; HVAC devices including but not limited to thermostats, occupancy sensors, air conditioning units, heating units, filtration systems, fans, humidifiers; shading elements including but not limited to motorized window treatments, dimmable windows; security elements including but not limited to security cameras, monitors and door locks; household appliances including but not limited to refrigerators, ovens, blenders, microwaves; control devices including but not limited to switches, relays, current limiting devices; and industrial devices including but not limited to motors, pumps, chillers, and air compressors.

The control system may comprise one or more additional control points (not shown) for receiving user inputs to control one or more controllable devices 15. The control points may be keypads, touchpanels, remote controls and thermostats. Additionally, the control points may be user interfaces of the controllable devices 15 themselves. The control point transmits control commands to communication network to control the device. For example, the control point may communicate with the controllable device 15 or with a control processor of the control network either directly or via one or more gateways and repeaters.

The control point may comprise feedback indicators to provide feedback to the user. The feedback may comprise visual feedback and audible feedback. Feedback may be provided by the control point upon receiving a user input, upon requesting feedback or upon a change in the status of the controllable device 15.

The control system may comprise one or more control processors 19. The control processor 19 is connected to the various controllable devices 15 via a wire line or wireless connection. The control processor 19 may be a CP3 control processor available from Crestron Electronics, Inc. of Rockleigh, N.J. The CP3 control processor provides a complete integrated automation solution. The various controllable devices 15 of the facility becomes integrated and accessible through the control processor 19. In other embodiments, the control processor may be a server, a personal computer or any other electronic device capable of processing electrical signals.

FIG. 3 is a block diagram depicting the control processor 19, according to an illustrative embodiment of the invention. Control processor 19 is used to control various devices, for example, security devices (e.g., door locks), lighting system devices, blinds/drapes, Heating, Ventilating, and Air Conditioning (HVAC) system devices, and sensors such as motion sensors. The one or more control processors 19 may comprise one or more logic engines for processing control commands.

The control processor 19 may include at least one central processing unit (CPU) 191. For example, the CPU 191 may represent one or more microprocessors, and the microprocessors may be "general purpose" microprocessors, a combination of general and special purpose microprocessors, or application specific integrated circuits (ASICs). Additionally or alternatively, the CPU 191 may include one or more reduced instruction set (RISC) processors, video processors, or related chip sets. The CPU 191 may provide processing capability to execute an operating system, run various applications, and/or provide processing for one or more of the techniques described herein. Applications that may run on the control processor 19 may include, for example, a logic engine for processing control commands, software for managing a calendar, software for controlling other electronic devices via a control network as noted above.

A main memory 192 may be communicably coupled to the CPU 191, which may store data and executable code. The main memory 192 may represent volatile memory such as RAM, but may also include nonvolatile memory, such as read-only memory (ROM) or Flash memory. In buffering or caching data related to operations of the CPU 191, the main memory 192 may store data associated with applications running on the control processor 19.

The control processor 19 may also include nonvolatile storage 193. The nonvolatile storage 193 may represent any suitable nonvolatile storage medium, such as a hard disk drive or nonvolatile memory, such as Flash memory. Being well-suited to long-term storage, the nonvolatile storage 193 may store data files such as media (e.g., music and video files), software (e.g., for implementing functions on the control processor), preference information (e.g., media playback preferences), lifestyle information (e.g., food preferences), exercise information (e.g., information obtained by exercise monitoring equipment), transaction information (e.g., information such as credit card information), wireless connection information (e.g., information that may enable media device to establish a wireless connection such as a telephone connection), subscription information (e.g., information that maintains a record of podcasts or television shows or other media a user subscribes to), as well as telephone information (e.g., telephone numbers).

One or more network interfaces 198 may provide connectivity for the control processor 19. The network interface 198 may represent, for example, one or more NICs or a network controller. In certain embodiments, the network interface may include a PAN interface 198a. The PAN interface 198a may provide capabilities to network with, for example, a Bluetooth® network, an IEEE 802.15.4 (e.g. Zigbee network), or an ultra wideband network. As should be appreciated, the networks accessed by the PAN interface may, but do not necessarily, represent low power, low bandwidth, or close range wireless connections. The PAN interface 198a may permit one electronic device to connect to another local electronic device via an ad-hoc or peer-to-peer connection. However, the connection may be disrupted if the separation between the two electronic devices exceeds the range of the PAN interface 198a.

The network interface may also include a LAN interface 198b. The LAN interface 198b may represent an interface to a wired Ethernet-based network but may also represent an interface to a wireless LAN, such as an 802.11x wireless network. The range of the LAN interface may generally exceed the range available via the PAN interface. Additionally, in many cases, a connection between two electronic devices via the LAN interface 198b may involve communication through a network router or other intermediary device.

Ethernet connectivity enables integration with IP-controllable devices 15 and allows the control processor 19 to be part of a larger managed control network. Whether residing on a sensitive corporate LAN, a home network, or accessing the Internet through a cable modem, the control processor 19 may provide secure, reliable interconnectivity with IP-enabled devices, such as touch screens, computers, mobile devices, video displays, Blu-ray Disc® players, media servers, security systems, lighting, HVAC, and other equipment—both locally and globally.

The control processor 19 may also include one or more wired input/output (I/O) interface 197 for a wired connection between one electronic device and another electronic device. One or more wired interfaces may represent a serial port, for example a COM port or a USB port. Additionally, the wired I/O interface 197 may represent, for example, a Cresnet port. Cresnet provides a network wiring solution for Crestron keypads, lighting controls, thermostats, and other devices that don't require the higher speed of Ethernet. The Cresnet bus offers wiring and configuration, carrying bidirectional communication and 24 VDC power to each device over a simple 4-conductor cable.

One or more IR interfaces may enable the control processor 19 to receive and/or transmit signals with infrared light. The IR interface may comply with an infrared IrDA specification for data transmission. Alternatively, the IR interface may function exclusively to receive control signals or to output control signals. The IR interface may provide a direct connection with one or more devices such as a centralized AV sources, video displays, and other devices.

One or more programmable relay ports may enable the control processor 19 to control window shades, projection screens, lifts, power controllers, and other contact-closure actuated equipment. One or more "Versiport" I/O ports may enable the integration of occupancy sensors, power sensors, door switches, or anything device that provides a dry contact closure, low-voltage logic, or 0-10 Volt DC signal.

For some embodiments of the control processor 19, the network interfaces may include the capability to connect directly to a WAN via a WAN interface 198c. The WAN interface 198c may permit connection to a cellular data network, such as the EDGE network or other 3G network. When connected via the WAN interface 198c, the control processor 19 may remain connected to the Internet and, in some embodiments, to another electronic device, despite changes in location that might otherwise disrupt connectivity via the PAN interface 198a or the LAN interface 198b.

By leveraging remote access of the control processor 19, a user may control the devices or environment settings in a facility from anywhere in the world using a portable electronic device 13.

The control system comprises a communication network 17 which provides access with and between devices of the control network. The communication network 17 may be a PAN, LAN, metropolitan area network, WAN, an alternate network configuration or some combination of network types and/or topologies. Communication network 17 may include one or more gateway devices (not shown).

The gateways of communication network 17 preferably provide network devices with an entrance to communication network 17 and may include software and/or hardware components to manage traffic entering and exiting communication network 17 and conversion between the communication protocols used by the network devices and communication network 17. In certain embodiments, the gateways of communication network 17 may function as a proxy server and a firewall server for network devices. Further, the gateways may be associated with a router operable to direct a given packet of data that arrives at a gateway and a switch operable to provide a communication path into and out of each gateway.

In one embodiment, communication network 17 may be a public switched telephone network (PSTN). In alternate embodiments, communication network 17 may include a cable telephony network, an IP (Internet Protocol) telephony network, a wireless network, a hybrid Cable/PSTN network, a hybrid IP/PSTN network, a hybrid wireless/PSTN network or any other suitable communication network 17 or combination of communication networks. In addition, other network embodiments can be deployed with many variations in the number and type of devices, communication networks, the communication protocols, system topologies, and myriad other details without departing from the spirit and scope of the present invention.

FIG. 4 illustrates an exemplary embodiment of a system for providing individualized control, according to an illustrative embodiment of the invention. The system 10 comprises a lighting control device 151, an AV device 152, an HVAC device 153, a keypad 41 with an integrated NFC tag 43, a smart phone 13, a communication network 17 and a control processor 19. It should be noted that the exemplary embodiment of the system illustrated in FIG. 3 may be varied in one or more aspects without departing from the spirit and scope of the teachings disclosed herein.

The lighting control device 151 may be a dimmer which limits the amount of electrical power supplied to a lighting load to vary the intensity level of the lighting load according to the control command. For example, the lighting dimmer may be a phase controlled lighting dimmer such as a triac. The AV device 152 may be a content sink for playing content such as an AV receiver. The HVAC device 153 may be a thermostat for regulating the temperature of the location.

The keypad 41 receives inputs from a user for controlling one or more of the controllable devices 15. For example, the keypad 41 may be dedicated to the lighting device 151 or may correspond to one or more devices in the location. In this embodiment, a scene button may correspond to a control of the lighting device 151, the HVAC device 153 and the AV device 152. The keypad 41 transmits control commands to the control processor 19 via the communication network 17. The control processor 19 processes control commands received from the keypad 41 and executes control commands such as by transmitting control commands to the one or more controllable devices 15 via the communication network 17. Additionally, the control processor 19 may provide feedback to the keypad 41 via the communication network 17.

Refer to FIG. 5 which shows the keypad of FIG. 4 in further detail. In this embodiment the keypad 41 is configured for controlling one or more lighting control devices 151 as part of a control network. For example, the keypad 41 may be a Cameo keypad 41 available from Crestron Electronics, Inc. of Rockleigh, N.J. The keypad 41 comprises a double height "on" button 411a, a "scene 1" button 411b, a "scene 2" button 411c, a "scene 3" button 411d, a split-key raise button 411e and a split-key lower button 411f.

The keypad 41 receives user inputs for controlling the controllable lighting device 151 in the form of button actuations. In response to the user inputs, the keypad 41 transmits control commands to the control processor 19 via the communication network 17. Additionally, the keypad 41 may receive feedback from the control processor 19 via the communication network 17.

The "on" button 411a switches the one or more controllable lights on and off. For example, the "on" button 411a may toggle one or more lights between full on and full off or it may toggle between the most recent light intensity level and full off. The "scene 1" button 411b, "scene 2" button 411c and "scene 3" button 411d set one or more light intensity levels according to a predefined scene. For example, the "scene 1" button 411b may correspond to a theater setting with overhead lighting being shut off and uplighting being dimmed to a preset level.

The keypad 41 further comprises six LED lights 412a-f for providing visual feedback to the user. One or more visual indicators 412a-f corresponding to an adjacent button may light when the button is pressed. Additionally, visual indicators 412a-f may provide feedback as to the lighting level of the one or more lights. Visual indicators 412a-f may also provide feedback to the user during programming events.

The keypad 41 further comprises an NFC tag 43. The NFC tag 43 encodes a network address of the keypad 41, an application identifier and an ID of the target control network. In an embodiment of the invention, the NFC tag 43 encodes a button configuration of the keypad 41 and a button functionality of the keypad 41. The NFC tag 43 may further encode one or more physical traits of the keypad 41 such as a foreground color and a background color of the keypad 41 button.

The NFC tag 43 is configured for being read by an NFC interface 139 in a passive communication mode. In this mode, the NFC tag 43 draws its operating power from the electromagnetic field provided by the NFC interface 139 of the initiator device. Advantageously, the NFC tag 43 does not require a power supply for operation.

In the embodiment shown in FIG. 5, the NFC tag 43 is disposed on a back surface of a faceplate 413 of the keypad 41. An indicator marking 415 is disposed on the front surface of the faceplate 413 aligned with the NFC tag 43. The indicator marking 415 alerts the user as to the presence and location of an NFC tag 43 on a keypad 41. The indicator marking 415 may be an industry standard mark or a corporate logo or design. It should be noted that the NFC tag 43 need not be disposed on a surface of the keypad 41. For example, the NFC tag 43 may be embedded in the faceplate 413 or be disposed on or embedded in another portion of the keypad 41, such as a housing or a bezel frame. As discussed above, employing the faceplate of a keypad 41 provides the benefits of having a familiar and near universal point for disposing NFC tags 43. Alternatively, the NFC tag 43 may be disposed on a different device or be independent from any device, such as by being disposed on a surface of the room.

In this embodiment, the personal electronic device is a smart phone storing a control application, such as the Crestron Mobile Pro control application. The control application may be stored in the phone from an application marketplace such as the Google Play application marketplace or the iTunes® application marketplace.

FIGS. 6a and 6b are a flowchart showing steps for performing a method of providing individualized control via near field communication, according to an illustrative embodiment of the invention. Referring back to FIG. 4, in step 601, a user positions the portable electronic device 13 such that the NFC interface 139 is in communication range with the NFC tag 43. The user may tap a surface of the portable electronic device 13 near the NFC tag 43 to the indicator marking 145 of the keypad 41 or position the NFC interface 139 of the portable electronic device 13 to within a range of approximately two to four centimeters of the NFC tag 43.

The portable electronic device 13 reads the information, such as a tag ID, application identifier and ID of the control network, encoded on the NFC tag 43 over an NFC communication channel 20. Upon placing the portable electronic device 13 within NFC communication range of the NFC tag 43, the NFC interface 139 of the portable electronic device 13 creates an electromagnetic field, thereby energizing the NFC tag 43. The NFC tag 43 is configured for manipulating the generated electromagnetic field according to the encoded information via load modulation. The NFC interface 139 of the portable electronic device 13 reads the encoded information from the modulated electromagnetic field.

FIG. 7 is a visual representation of an NFC tag, according to an illustrative embodiment of the invention. The NFC tag 43 is encoded with an application identifier 431, a header 432 and one or more optional payloads 436a-n. The application identifier 431 identifies the control application associated with the NFC tag 43. In certain embodiments of the invention, the application identifier 431 is encoded according to operating system requirements. For example, in the Android operating system, each program approved to be offered in the Google Play store requires an application identifier 431. This application identifier 431 is encoded on the NFC tag 43 and understood by the Android operation system.

The header 432 further comprises a tag ID 433, a project file ID 434 and a control processor ID 435. The tag ID identifies the NFC tag 43. The project file ID 434 identifies a project file corresponding to the control system incorporating the NFC tag 43. The control processor ID 435 identifies a control processor 19 corresponding to the control system incorporating the NFC tag 43.

Each of the one or more payloads 436 comprises a user ID 437, a page ID 438 and action information. The user ID 437 establishes for which user that payload 436 is associated with. The user ID 437 of one payload 436 may be left unassigned. A payload 436 with an unassigned user ID 437 may function as a general payload 436 associated with all user IDs. Action information relates to a control function to be performed and may be an instruction to be executed or information to be processed by the control processor 19. In an embodiment of the invention, the action information comprises a join number 439 and a join value 440. The join number 439 may be set by a programmer and indicates which control function the payload 436 is associated with and the digital join value which also may be set by a programmer indicates which state of the control function is requested. For example, the join number 439 may correspond to a button of the keypad 41 for selecting a lighting scene and the join value 440 is a binary number indicating whether the button is pressed or not. The control processor 19 may execute the join number 439 or may perform additional processing.

If the NFC tag 43 includes one or more payloads 436 including a user ID 437 and one or more of the user IDs 437 matches the user ID associated with the portable electronic device 13 or control application, the payload 436 corresponding to that user ID 437 is selected. Advantageously, as the NFC tag 43 comprises more than one payload 436, each payload 436 may be tailored to individuals. For example, a tag may include a first payload 436a which results in a first AV source being played for a first user and a second payload 436b which results in a second AV source being played for a second user.

In embodiments of the invention in which the NFC tag 43 encodes information in addition to the header 432 and one or more payloads 436, such as the button configuration of a keypad 41, button functionality of a keypad 41 and one or more physical characteristics of a keypad 41, the NFC interface 139 reads this information from the NFC tag 43 as well.

If after reading the application identifier 431, the portable electronic device 13 determines the application associated with the application identifier 431 is not downloaded on the phone, in step 602 the portable electronic device 13 directs the user to an application marketplace where they can download the application associated with the application identifier 431. For example, the phone may load a relevant application page of the iTunes@ application marketplace or Google Play application marketplace.

In step 603, the application is downloaded to the portable electronic device 13 from the application page of the application marketplace. Upon downloading the control application, the control application may prompt the user to enter a user ID 437, such as an email address or a network ID. This user ID 437 will be associated with the control application.

In step 604, if the control application associated with the application identifier 431 is stored on the portable electronic device 13, the portable electronic device 13 loads the control application. The application identifier 431 read from the NFC tag 43, instructs the portable electronic device 13 which control application to launch. Such control application may be Crestron Mobile Pro® as described above.

For the one or more payloads encoded on the NFC tag 43, the portable electronic device 13 will either select a desired payload 436 or display an error message. If the NFC tag 43 is encoded with a single payload 436 with an unassigned user ID 437, this payload 436 is automatically selected as the desired payload 436 in step 606.

If the NFC tag 43 is encoded with one or more payloads 436 with an assigned user ID 437 and the user ID 437 of the control application matches one of the assigned user IDs 437, the payload 436 associated with this assigned user ID 437 is selected as the desired payload 436 in step 606. In the absence of a matching payload 436, a payload 436 with an unassigned user ID 437 may be selected. For example, an NFC tag 43 may be programmed with payloads 436 for specific users as well as a single generic payload 436 with an unassigned user ID 437 for all other users.

If the tag does not include either a payload 436 with a matching user ID 437 or an unassigned user ID 437, the portable electronic device 13 displays an error page of the control application in step 605. The error page may include text explaining that the NFC tag 43 does not include any payloads 436 associated with that user.

Advantageously, this may function as a security function, allowing only certain users to access control of a particular area or device. In an embodiment of the invention, certain control functions for a room may be accessed only via a payload 436 on an NFC tag 43. For example, only administrators may have the access to AV devices within a conference room. The error page may alert users as to this policy or inform users that they are not allowed to access that area of the facility.

In another embodiment of the invention, the error page may include information detailing how to program the NFC tag 43 with a payload 436 or direct the user to a webpage including this information. For example, the error page may include an contact information for a facility manager or control system programmer.

The control application checks the project file received via the NFC tag 43 against the IDs of project files stored on the portable electronic device 13. If the associated project file is stored on the portable electronic device 13, the control application loads the project file of the control network. The project file may be stored locally in the smart phone or may be downloaded from the control network. As an example, in situations where a user has previously connected to the control network via the smart phone, the project file may be stored on the smart phone. In situations where a user has not previously connected to the control network, a control processor 19 may upload the project file to the smart phone (step 609) upon receiving the ID of the NFC tag 43 and identifying information of the portable electronic device 13.

If the control application does not have the project file corresponding to the project file ID 434 stored on the portable electronic device 13, the associated project file must be downloaded to the portable electronic device 13. In step 607, the portable electronic device 13 reads the control processor ID 435 from the NFC tag 43.

In step 608, the portable electronic device 13 establishes communication with the control processor 19 via the communication network 17.

In step 609, the portable electronic device 13 downloads the project file from the control system.

In step 610, the control application loads the project file.

In step 611, a page of the control application corresponding to the page ID 438 is displayed on the portable electronic device 13. The menu page of the control application comprises one or more selectable visual items corresponding to the one or more control functions of the controllable devices 15.

FIG. 8 is a schematic of a menu page that may be displayed on the portable electronic device 13 for controlling the controllable device 15, according to an illustrative embodiment of the invention. The menu page 80 is displayed as a graphic representation of the keypad 41 including one or more selectable items 81a-f displayed as buttons of the keypad 41. The keypad 41 is displayed with the same button configuration as the physical keypad 41 and the one or more selectable items 81A-F are configured to correspond to the same button functionality of the physical keypad 41. In this embodiment, the one or more selectable items 81A-F are displayed as a graphic representation of the keypad 41, thereby providing an intuitive graphic user interface (GUI) for controlling the load.

The menu page comprises a graphical "On" button icon 81A, a graphical "Scene 1" button icon 81B, a graphical "Scene 2" button icon 81C, a graphical "Scene 3" button icon 81D, a split key "Lower" button icon 81E and a split key raise button icon 81F. Additionally, the menu page comprises six graphical visual indicators 82A-F corresponding to the six graphical visual indicators of the physical keypad 41. The graphic visual indicators may be displayed as lit in accordance with the operation of the physical visual indicators of the keypad 41. As an example, the visual indicators may be briefly displayed as lit when a corresponding graphical button is selected much as a physical visual indicator flashes when a corresponding physical button is depressed.

Alternatively, the page ID 438 may correspond to a page of the control application displaying menu options for a zone of the facility. FIG. 9 is a schematic of a menu page 90 that may be displayed on the portable electronic device 13 for controlling one or more controllable devices 15 in the zone, according to an illustrative embodiment of the invention. The menu includes one or more selectable 92A-G items arranged in groups 91A-C. The groups 91A-C may be associated by controllable device 15. For example, one or more selectable items 92F-G corresponding to HVAC controls may be grouped together in an HVAC group 91C. Additionally, one or more selectable items 92C-E corresponding to AV control may be grouped together in an AV group 91B. Upon selecting one of the selectable items, the portable electronic device 13 will display a page of control options corresponding to the selectable item. For example, upon selecting the projector selectable item 92E, the portable electronic device 13 may display a projector page comprising a menu of selectable items corresponding to control options for a projector.

Alternatively, the page ID 438 may correspond to a page of the control application displaying the most commonly used control functions within a zone. FIG. 10 is a schematic of a menu page 100 that may be displayed on the portable electronic device 13 for controlling one or more controllable devices 15 in the zone, according to an illustrative embodiment of the invention.

In step 612, upon launching the control application, the control application is configured for automatically transmitting identity and control information to the control processor 19. The identity information may comprise a user ID 437, a tag ID 433 and a device ID. In an embodiment of the invention, the control information may comprise a control command to be executed. In other embodiments, the control information may comprise information processed by the control system to determine the desired control to be executed, such as a join number 439 and a join value 440 (i.e. a join may be an action and a join number and a join value may collectively be an action). Additionally, the join number 439 may correspond to a plurality of desired controls. For example, a join number 439, such as "join 85" may correspond to setting a desired scene by controlling one or more of the lighting devices 151, AV devices 152 and HVAC devices 153.

Accordingly, the desired control may be defined at the tag with header information or at the processor. In an embodiment of the invention, the control processor 19 further comprises a logic engine for processing control information. If for a certain join number 439, there are not different results, in step 613, the processor processes the join directly. For example, in a certain area of the facility, it may be desirable to perform one or more controls regardless of user or device.

If for a certain join number 439 the desired control depends on the user, the control processor 19 will demultiplex the join based on the user in step 614. For example, in a certain area of the facility, two or more users may each desire a preferred lighting set point. Accordingly, a join may correspond to a different lighting level and therefore control command for each user.

If for a certain action the desired control depends on the user and the device, the control processor 19 will demultiplex the join number 439 based on the user and the device in step 615. For example, the desired control command may depend on not only the user, but which device the user employs. For example, the user may desire a different scene depending on whether he is using his smart phone or his tablet computer.

FIG. 11 illustrates an exemplary embodiment of a system for providing individualized control, according to another illustrative embodiment of the invention. The system comprises a lighting device 151, an audiovisual device 152, an HVAC device 153, a plurality of RF beacons 16a-n, a portable electronic device 13, a communication network 17 and a control processor 19. It should be noted that the exemplary embodiment of the system illustrated in FIG. 3 may be varied in one or more aspects without departing from the spirit and scope of the teachings disclosed herein.

The system further comprises one or more RF beacons 16 configured for communicating via Bluetooth 4.0 protocols. The RF beacons 16 each transmit their location as well as their signal strength. Preferably, a plurality of RF beacons 16 are placed strategically throughout a structure to enable the portable electronic device 13 to be in communication range with three RF beacons 16 at any time. In this embodiment, the system comprises at least three RF beacons 16. Advantageously, this allows for estimation of location to a point using trilateration. In other embodiments with less than three RF beacons 16, location may be estimated within a range.

However, it should be noted that the system may comprise less than three beacons 16. The particular layout of a structure may only require that a portable electronic device 13 be in communication with one or two RF beacons 16 to accurately determine in which room or location the portable electronic device 13 is located.

FIG. 11 shows a system comprising at least three RF beacons 16 configured for communicating according to Bluetooth 4.0 standards, according to an illustrative embodiment of the invention. Each RF beacon 16 periodically transmits its identity, such as a network address, as well as its broadcast strength according to Bluetooth 4.0 standards. By comparing the broadcast signal strength to the received signal strength of each beacon, the portable electronic device 13 may estimate its distance to each beacon. Accordingly, by mapping the beacon ID to a location and by determining its distance to one or more beacons 16, the portable electronic device 13 may determine its location in a facility.

In this embodiment, the personal electronic device 13 is a smart phone storing a control application, such as the Crestron Mobile Pro control application. The control application may be stored in the phone from an application marketplace such as the Google Play application marketplace or the iTunes® application marketplace.

FIG. 12 shows a schematic of a facility with a plurality of rooms, each comprising an RF beacon, according to an illustrative embodiment of the invention. For example, the facility may be a corporate building comprising offices and conference rooms. An RF beacon 16 is placed in each room of the facility. The RF beacon 16 may be placed in a common location such as a light switch or touch panel or may be placed in a remote location out of view. Each RF beacon 16 periodically transmits its identity and signal strength. The portable electronic device 13 periodically listens for RF beacon 16 transmissions. The portable electronic device 13 determines a first range 1202, a second range 1203 and a third range 1204 to a first RF beacon 16*a*, a second RF beacon 16*b* and a third RF beacon 16*c*, respectively. Preferably the portable electronic device 13 determines the first range 1202, second range 1203 and third range 1204 with the three RF beacons 16 with the strongest received signal. The portable electronic device 13 may determine its location by calculating the intersection of the first range 1202, second range 1203 and third range 1204. By strategically placing RF beacons 16 throughout a facility, the portable electronic device 13 may determine its location throughout the facility by periodically calculating its range to three RF beacons 16.

FIGS. 13A and 13B are a flowchart showing steps for performing a method of providing individualized control via communication with RF beacons, according to an illustrative embodiment of the invention. The method shown in FIGS. 13A and 13B may be repeated periodically or may be initiated by user control.

Referring back to FIG. 11, in step 1301, the control application is opened on the portable electronic device 13 and a project file corresponding to the facility is loaded. The control application is configured for periodically searching for RF beacons 16 while operating in the background.

In step 1302, a user positions the portable electronic device 13 such that the PAN interface of the smart phone is in communication range with the first RF beacon 16*a*, second RF beacon 16*b* and third RF beacon 16*c*. The user may simply walk into communication range while carrying the portable electronic device 13.

In step 1303, the portable electronic device 13 receives the location and transmission strength of an RF beacon 16. The RF beacon 16 periodically transmits its location and transmission strength. Additionally, the portable electronic device 13 periodically listens for RF beacon 16 transmissions. The identity may be a network address of the beacon or may be a location such as coordinates or a zone. There are advantages associated with each of these schemes. By transmitting identity as a location, the portable electronic device 13 does not need to match the identity with a location. Contrastingly, by transmitting a network address as an identity, the location need not be programmed on the RF beacon 16 and the beacons 16 may be relocated after deployment without reprogramming the beacon 16.

In step 1304, the control application estimates a distance to the RF beacon. By comparing the transmission signal strength of each RF beacon 16 with the received signal strength of each beacon, the control application may determine its distance from each RF beacon.

In this embodiment, the control application continues listening until receiving a transmission from three RF beacons 16. In embodiments in which more than three beacons 16 are in range, the control application may use the three strongest received signals. Additionally, the control application may use the identity and signal strength of additional RF beacons 16 as an error check or redundancy. The control application repeats steps 1303 and 1304 for each of the RF beacons 16 thereby estimating a range to at least three RF beacons.

In step 1305, the control application determines its location according to the location information received from the RF beacons 16 via trilateration. The position of each RF beacon 16 is known as well as an estimated distance to at least three RF beacons 16, the control application may determine its location. By determining the intersection point of the three ranges to three RF beacons 16, the control application may determine the location of the portable electronic device 13.

In step 1306, the control application maps location to a floor plan of the facility. By mapping the location to a floor plan, the control application may know which room the portable electronic device 13, and therefore the user, is located.

In step 1307, the portable electronic device 13 transmits its network address as well as its location to the control processor 19 via the communication network 17. The identity information may comprise a user ID and a device ID. In an embodiment of the invention, the location information may comprise a zone of the facility or a coordinate in the location However as will be discussed in reference to FIG. 14 and FIGS. 15A and 15B, in certain embodiments the portable electronic device 13 may not be configured to communicate via the communication network 17. In these applications, the one or more RF beacons 16 may act as an intermediary gateway between the portable electronic device 13 and the control processor 19.

In step 1308, a page of the control application corresponding to the location is displayed on the portable electronic device 13. The control application may associate the location with a page ID 438 or alternatively, the control application may receive the page ID 438 from the control processor 19. The menu page of the control application comprises one or more selectable visual items corresponding to the one or more control functions of the controllable devices 15. For example, the menu pages shown in FIGS. 8-10 may be displayed on the portable electronic device 13.

The control processor 19 is programmed to execute one or more control commands in response to receiving the identity and location of the portable electronic device 13. In this embodiment, the control processor 19 associates the user and location with one or more actions. In an embodiment of the invention, the control processor 19 further comprises a logic engine for processing control information. If for a certain location, there are not different results, in step 1309, the processor determines a desired control action according to the location. For example, in a certain area of the facility, it may be desirable to perform one or more controls regardless of user or device.

If for a certain location the desired control depends on the user, the control processor 19 will determine the control action based on the user in step 1310. For example, in a certain area of the facility, two or more users may each desire a preferred lighting set point. Accordingly, the location may correspond to a different lighting level and therefore control command for each user.

If for a certain action the desired control depends on the user and the device, the control processor 19 will determine the action based on the user and the device in step 1311. For example, the desired control command may depend on not only the user, but which device the user employs. For example, the user may desire a different scene depending on whether he is using his smart phone or his tablet computer.

FIG. 14 is a system for providing individualized control via communication with RF beacons, according to an illustrative embodiment of the invention. FIG. 15 is a flowchart showing steps for performing a method of providing individualized control via communication with RF beacons, according to an illustrative embodiment of the invention. In an embodiment of the invention, the portable electronic device 13 may not be configured to communicate on the communication network 17. The user of the portable electronic device 13 may be a guest such as in a visitor to a residence, a hotel, a corporate office or other commercial facility. In this embodiment, the portable electronic device 13 may communicate with the control processor 19 via an RF beacon.

In step 1501, a control application is opened on the portable electronic device 13 and a guest project file is loaded.

Step 1502 through step 1506 of the method shown in FIG. 14 proceed in substantially the same manner as steps 1302 through 1306 of the method illustrated in FIG. 12. Specifically, in step 1502, a user positions the portable electronic device 13 such that the PAN interface of the smart phone is in communication range with the first RF beacon 16a, second RF beacon 16b and third RF beacon 16c. In step 1503, the portable electronic device 13 receives the location and transmission strength of an RF beacon 16. In this embodiment, the control application continues listening until receiving a transmission from three RF beacons 16. In step 1504, the control application estimates a distance to each RF beacon 16 according to the received signal strength and broadcast signal strength as described above. In step 1505, the control application determines its location according to the location information received from the RF beacons 16 via trilateration. In step 1506, the control application maps location to a floor plan of the facility. By mapping the location to a floor plan, the control application may know which room the portable electronic device 13, and therefore the user, is located.

Upon the control application determining its location, in step 1507 the control application pairs the portable electronic device 13 to the nearest RF beacon 16 using RF communication protocols such as Bluetooth communication protocols. The control application may determine the nearest RF beacon 16 based on signal strength of the received broadcast or by looking up the nearest RF beacon 16 to its location from a stored directory.

Upon pairing with the RF beacon 16, in step 1508, the portable electronic device 13 transmits its network address as well as its location to the RF beacon 16.

In step 1509, the RF beacon 16 transmits identity information and location information of the portable electronic device 13 to the control processor.

In step 1510, the control processor determines a level of access for the given user and portable electronic device 13, according to the identity information. For example, the control processor may check a database of registered users to determine the access level. The database may be updated by security personnel of the facility. For example, the facility may be a hotel and active guests may be enetered into the database at a guest level. Alternatively, the database may be for an office with current employees with access level determined by employment level.

The control processor 19 is programmed to execute one or more control commands in response to receiving the identity and location of the portable electronic device 13. In this embodiment, the control processor 19 associates the user and location with one or more actions. In an embodiment of the invention, the control processor 19 further comprises a logic engine for processing control information. If for a certain location, there are not different results, in step 1511, the processor determines a desired control action according to the location. For example, in a certain area of the facility, it may be desirable to perform one or more controls regardless of user or device.

If for a certain location the desired control depends on the user, the control processor 19 will determine the control action based on the user in step 1512. For example, in a certain area of the facility, two or more users may each desire a preferred lighting set point. Accordingly, the location may correspond to a different lighting level and therefore control command for each user.

If for a certain action the desired control depends on the user and the device, the control processor 19 will determine the action based on the user and the device in step 1513. For example, the desired control command may depend on not only the user, but which device the user employs. For example, the user may desire a different scene depending on whether he is using his smart phone or his tablet computer.

In step 1514, the control application transmits a page ID to be displayed on the portable electronic device 13 to the RF beacon 16. The page ID may correspond to the location of the portable electronic device 13 in an embodiment of the invention. In another embodiment of the invention the page ID may correspond to the user. For example, the page ID may correspond to the individual user or may correspond to a level of access of the user.

In step 1515, the RF beacon transmits the page ID to the portable electronic device 13 via the PAN.

In step 1516, the portable electronic device 13 displays a menu page of the control application corresponding to the page ID transmitted by the control processor 19 via the RF beacon 16. For example, the menu pages shown in FIGS. 8-10 may be displayed on the portable electronic device 13.

In step 1517, the portable electronic device 13 transmits a control action to the RF beacon 16. The user may select one or more of selectable items from the menu page displayed on the portable electronic device 13. The one or more selectable items may correspond to the control actions.

In step 1518, the RF beacon 16 transmits the control action received from the portable electronic device 13 to the control processor 19.

INDUSTRIAL APPLICABILITY

To solve the aforementioned problems, the present invention is a unique system in which a portable electronic device 13 communicates with a keypad 41 or RF beacon to establish remote control of the device over the network.

LIST OF ACRONYMS USED IN THE DETAILED DESCRIPTION OF THE INVENTION

The following is a list of the acronyms used in the specification in alphabetical order.
ASIC application specific integrated circuit
AV audio visual
CPU central processing unit
DVD digital versatile disk
GUI graphical user interface
LAN local area network
IP internet protocol
IR infrared
NFC near field communication
PAN personal area network
PSTN public switched telephone network
RF radio frequency
RFID radio frequency identification
RISC reduced instruction set
URL uniform resource locator
WAN wide area network

ALTERNATE EMBODIMENTS

Alternate embodiments may be devised without departing from the spirit or the scope of the invention. For example, the NFC tag 43 may encode a uniform resource locator (URL) address directing the portable electronic device 13 to a location for downloading the control application.

What is claimed is:
1. A system for providing individualized control, the system comprising:
(a) an NFC tag encoding encoded information comprising a tag ID, control system information and one or more payloads, each of the one or more payloads further comprising an action; and
(b) a portable electronic device identified by a user ID and comprising an NFC interface, a network interface, a display, a memory encoding one or more processor-executable instructions and a processor configured to load the one or more processor-executable instructions when encoded from the memory, wherein the one or more processor-executable instructions, when executed by the processor, cause acts to be performed comprising:
(i) reading the encoded information from the NFC tag via the NFC interface of the portable electronic device,
(ii) selecting a desired action from one of the one or more payloads,
(iii) establishing communication with a control processor corresponding to the control system information via the network interface, including:
(1) receiving, from each of at least three beacons, a transmission signal strength of a signal transmitted by that beacon,
(2) determining, for each of the at least three beacons, a received signal strength of the signal transmitted by that beacon, and
(3) estimating, for each of the at least three beacons, a distance between the portable electronic device and that beacon based on a difference between the transmission signal strength and the received signal strength of the signal transmitted by that beacon,
(4) selecting a nearest one of the at least three beacons based on the distances estimated from the transmission signal strength and the received signal strength of the at least three beacons, and
(5) transmitting the user ID and location of the portable electronic device to the control processor via the selected beacon, and
(iv) transmitting the desired action to the control processor via the selected beacon.
2. The system of claim 1 wherein:
(a) the NFC tag further encodes an application identifier; and
(b) the one or more processor executable instructions, when executed by the processor, cause acts to be performed comprising opening a control application on the portable electronic device corresponding to the application identifier.
3. The system of claim 2 wherein the control system information comprises a project file ID and a control processor ID.
4. The system of claim 3 wherein the one or more processor-executable instructions, when executed by the processor, cause acts to be performed further comprising:
(a) loading a project file corresponding to project file ID with the control application; and
(b) establishing communication with a control processor corresponding to the control processor ID.
5. The system of claim 4 wherein:
(a) the NFC tag further encodes a page ID; and
(b) the one or more processor-executable instructions, when executed by the processor, cause acts to be performed further comprising
(i) reading from the NFC tag the page ID via the NFC interface of the portable electronic device, and
(ii) displaying on the display a page of the control application corresponding to the page ID.
6. The system of claim 5 wherein the page of the control application comprises one or more selectable visual items representing one or more control functions of a controllable device.
7. The system of claim 6 wherein the page of the control application comprises one or more selectable visual items representing one or more control functions of a zone of a facility.
8. The system of claim 1 wherein the portable electronic device is further identified by a device ID and the one or more processor-executable instructions, when executed by the processor, cause acts to be performed further comprise transmitting the device ID to the control processor.
9. The system of claim 1 wherein:
(a) each of the one or more payloads further comprises a corresponding user ID; and

(b) the one or more processor-executable instructions, when executed by the processor, cause acts to be performed further comprising selecting a desired action from the one or more payloads by comparing each user ID of the one or more payloads with the user ID of the control application.

10. The system of claim 9 wherein:
(a) the NFC tag encodes a payload with an unassigned user; and
(b) one or more processor-executable instructions, when executed by the processor, cause acts to be performed further comprising selecting a desired action from the one or more payloads by selecting the action form the payload comprising the unassigned user ID when no payload user ID matches the device user ID.

11. The system of claim 9 wherein one or more processor-executable instructions, when executed by the processor, cause acts to be performed further comprising displaying an error page of the control application in response to no payload user ID's matching the device user ID.

12. The system of claim 1 wherein the NFC tag is associated with a controllable device.

13. The system of claim 1 wherein the NFC tag is associated with a location.

14. A system for providing individualized control, the system comprising:
(a) an NFC tag encoding an application identifier, a tag ID, a project ID, a control processor ID and one or more payloads, each of the one or more payloads further comprising an action; and
(b) a portable electronic device identified by a device ID and a user ID and comprising an NFC interface, a network interface, a display, a memory encoding one or more processor-executable instructions and a processor configured to load the one or more processor-executable instructions when encoded from the memory, wherein the one or more processor-executable instructions, when executed by the processor, cause acts to be performed comprising:
   (i) reading the encoded information from the NFC tag via the NFC interface of the portable electronic device,
   (ii) opening a control application on the portable electronic device corresponding to the application ID,
   (iii) loading a project file corresponding to project file ID with the control application,
   (iv) selecting a desired action from one of the one or more payloads,
   (v) establishing communication with a control processor corresponding to the control processor ID, including:
      (1) receiving, from each of at least three beacons, a transmission signal strength of a signal transmitted by that beacon,
      (2) determining, for each of the at least three beacons, a received signal strength of the signal transmitted by that beacon,
      (3) estimating, for each of the at least three beacons, a distance between the portable electronic device and that beacon based on a difference between the transmission signal strength and the received signal strength of the signal transmitted by that beacon,
      (4) selecting a nearest one of the at least three beacons based on the distances estimated from the transmission signal strength and the received signal strength of the at least three beacons, and
      (5) transmitting the user ID, the device ID, and location of the portable electronic device to the control processor via the selected, and
   (iv) transmitting the desired action to the control processor via the selected beacon; and
(c) the control processor comprising a network interface, a memory encoding one or more processor-executable instructions and a processor configured to load the one or more processor-executable instructions when encoded from the memory, wherein the one or more processor-executable instructions, when executed by the processor, cause acts to be performed comprising:
   (i) determining whether there are more than one corresponding executables for the desired action according to user IDs;
   (ii) processing the desired action directly if there are not more than one corresponding executables for the desired action according to user IDs;
   (iii) determining whether there are more than one corresponding executables for the desired action according to user IDs and device IDs;
   (iv) demultiplexing the desired action based on the user ID if there are not more than one corresponding executables for the desired action according to user IDs and device IDs; and
   (v) demultiplexing the desired action based on the user ID and the device ID if there are more than one corresponding executables for the desired action according to user IDs and device IDs.

15. The system of claim 14 wherein the portable electronic device is configured for downloading the project file from the control processor.

16. A method for providing individualized control, said method comprising:
(a) providing
   (i) an NFC tag encoding encoded information comprising an application identifier, a tag ID, control system information and one or more payloads, each of the one or more payloads further comprising an action,
   (ii) a portable electronic device identified by a device ID and a user ID and comprising an NFC interface, a network interface and a display, and
   (iii) a control processor identified by a control processor ID and comprising a network interface;
(b) positioning the NFC interface of the portable electronic device within communication range of the NFC tag;
(c) reading the encoded information from the NFC tag via the NFC interface of the portable electronic device;
(d) opening a control application on the portable electronic device corresponding to the application identifier;
(e) selecting a desired action from one of the one or more payloads;
(f) establishing communication with a control processor corresponding to the control processor ID, including:
   (i) receiving, from each of at least three beacons, a transmission signal strength of a signal transmitted by that beacon,
   (ii) determining, for each of the at least three beacons, a received signal strength of the signal transmitted by that beacon,
   (iii) estimating, for each of the at least three beacons, a distance between the portable electronic device and that beacon based on a difference between the transmission signal strength and the received signal strength of the signal transmitted by that beacon, (iv) selecting a nearest one of the at least three beacons based on the distances estimated from the transmission signal strength and the received signal strength of the at least three beacons, and (v) transmitting the user ID, the device ID, and location of the portable electronic device to the control processor via the selected beacon; and (g) transmitting the desired action to the control processor via the selected beacon.

17. The method of claim 16 wherein the control system information comprises a project file ID and a control processor ID.

18. The method of claim 16 further comprising the step of loading on the control application a project file corresponding to the project file ID.

19. The method of claim 16
   (a) wherein
      (i) the NFC tag further encodes a page ID corresponding to a page of the control application, and
      (ii) the step of reading from the NFC tag further comprises reading the page ID; and
   (b) further comprising the step of displaying on the portable electronic device a page of the control application corresponding to the page ID encoded on the NFC tag.

20. The method of claim 19 wherein the page further comprises one or more selectable items corresponding to a control action of a controllable device and wherein the method further comprises the steps of:
   (a) receiving a selection of one of the selectable items; and
   (b) transmitting a corresponding control action to the control processor.

21. The method of claim 16 wherein the step of selecting a desired action from the one or more payloads further comprises the steps of
   (a) determining if any of the one or more payloads comprise a user ID that matches the user ID of the portable electronic device;
   (b) selecting the action from a payload with a user ID matching the user ID of the portable electronic device as the desired action;
   (c) determining if any of the one or more payloads comprise an unassigned user ID;
   (d) selecting the action from a payload with an unassigned user ID as the desired payload if there are no payloads with user IDs matching the user ID of the portable electronic device; and
   (e) displaying an error page of the control application if there are no payloads with matching user IDs or a payload with an unassigned user ID.

22. The method of claim 16 further comprising the step of providing a control processor comprising a network interface.

23. The method of claim 22 wherein the step of loading the project file on the control application further comprises the steps of:
   (a) comparing the project ID encoded on the NFC tag with the project ID of project files stored on the portable electronic device; and
   (b) downloading the project file corresponding to the project ID if the desired project file is not stored on the portable electronic device.

24. The method of claim 22 further comprising the steps of:
   (a) determining whether there are more than one corresponding executables for the desired action for according to user IDs;
   (b) processing the desired action directly if there are not more than one corresponding executables for the desired action according to user IDs;
   (c) determining whether there are more than one corresponding executables for the desired action according to user IDs and device IDs;
   (d) demuliplexing the desired action based on the user ID if there are not more than one corresponding executables for the desired action according to user IDs and device IDs; and
   (e) demultiplexing the desired action based on the user ID and the device ID if there are more than one corresponding executables for the desired action according to user IDs and device IDs.

25. The system of claim 4 wherein:
   (a) the NFC tag further encodes a page ID associated with the location of the portable electronic device; and
   (b) the one or more processor-executable instructions, when executed by the processor, cause acts to be performed further comprising
      (i) reading, from the NFC tag via the NFC interface of the portable electronic device, the page ID associated with the location of the portable electronic device, and
      (ii) displaying, on the display, a page of the control application corresponding to the page ID and associated with the location of the portable electronic device.

26. The system of claim 4 wherein:
   (a) the one or more processor-executable instructions, when executed by the processor, cause acts to be performed further comprising
      (i) receiving, from the control processor via the selected beacon, a page ID associated with the location of the portable electronic device, and
      (ii) displaying, on the display, a page of the control application corresponding to the page ID and associated with the location of the portable electronic device.

27. The system of claim 14 wherein:
   (a) the one or more processor-executable instructions, when executed by the control processor, cause acts to be performed further comprising:
      (i) determining a level of access for the portable electronic device based on the user ID and the device ID.

28. The system of claim 14 wherein:
   (a) the one or more processor-executable instructions, when executed by the control processor, cause acts to be performed further comprising:
      (i) determining, for the location of the portable electronic device, whether there are more than one corresponding executables for the desired action according to user IDs;
      (ii) processing the desired action directly if there are not more than one corresponding executables for the desired action according to user IDs;
      (iii) determining, for the location of the portable electronic device, whether there are more than one corresponding executables for the desired action according to user IDs and device IDs;
      (iv) demultiplexing the desired action based on the user ID if there are not more than one corresponding executables for the desired action according to user IDs and device IDs; and
      (v) demultiplexing the desired action based on the user ID and the device ID if there are more than one corresponding executables for the desired action according to user IDs and device IDs.

29. The method of claim 16,
(a) wherein:
 (i) the NFC tag further encodes a page ID associated with the location of the portable electronic device,
 (ii) the step of reading from the NFC tag further comprises reading the page ID; and
(b) further comprising:
 (i) displaying, on the portable electronic device, a page of the control application corresponding to the page ID encoded on the NFC tag and associated with the location of the portable electronic device.

30. The method of claim 16, further comprising:
(a) receiving, from the control processor via the selected beacon, a page ID associated with the location of the portable electronic device, and
(b) displaying, on the display, a page of the control application corresponding to the page ID and associated with the location of the portable electronic device.

* * * * *